(12) United States Patent
Miyahara et al.

(10) Patent No.: US 7,559,608 B2
(45) Date of Patent: Jul. 14, 2009

(54) SEAT FOR VEHICLE

(75) Inventors: Tamio Miyahara, Hiroshima (JP);
Kouichi Nakaya, Hiroshima (JP);
Nanae Michida, Hiroshima (JP);
Hiroshi Okiyama, Hiroshima (JP);
Akihiro Kobayashi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 383 days.

(21) Appl. No.: 11/509,745

(22) Filed: Aug. 25, 2006

(65) Prior Publication Data

US 2007/0057559 A1    Mar. 15, 2007

(30) Foreign Application Priority Data

Sep. 14, 2005 (JP) ............... 2005-267054
Sep. 22, 2005 (JP) ............... 2005-276381
Sep. 22, 2005 (JP) ............... 2005-276383

(51) Int. Cl.
*A47C 1/10* (2006.01)
(52) U.S. Cl. ............ 297/408; 297/378.12; 297/391
(58) Field of Classification Search ........ 297/378.12, 297/391, 408
See application file for complete search history.

(56) References Cited

U.S. PATENT DOCUMENTS

| | | | | |
|---|---|---|---|---|
| 4,693,515 A | * | 9/1987 | Russo et al. | 297/391 |
| 5,290,091 A | * | 3/1994 | Dellanno et al. | 297/391 |
| 5,531,505 A | * | 7/1996 | Baetz et al. | 297/408 |
| 5,570,931 A | * | 11/1996 | Kargilis et al. | 297/378.12 |
| 5,683,141 A | * | 11/1997 | Wakamatsu et al. | 297/408 |
| 6,033,018 A | * | 3/2000 | Fohl | 297/216.13 |
| 6,045,181 A | * | 4/2000 | Ikeda et al. | 297/216.12 |
| 6,113,192 A | * | 9/2000 | Schneider | 297/403 |
| 6,129,421 A | * | 10/2000 | Gilson et al. | 297/408 |
| 6,279,996 B1 | * | 8/2001 | Albrecht | 297/403 |
| 6,394,544 B1 | * | 5/2002 | Bieven et al. | 297/283.4 |
| 6,616,235 B1 | * | 9/2003 | Khavari et al. | 297/408 |
| 6,746,083 B2 | * | 6/2004 | Drew et al. | 297/378.12 |
| 7,008,019 B2 | * | 3/2006 | Lampke et al. | 297/408 |

(Continued)

FOREIGN PATENT DOCUMENTS

DE    10319453 B3    6/2004

(Continued)

OTHER PUBLICATIONS

Extended European Search Report dated Dec. 28, 2006 for corresponding European patent application.

*Primary Examiner*—Laurie K Cranmer
(74) *Attorney, Agent, or Firm*—Studebaker & Brackett PC; Donald R. Studebaker

(57) ABSTRACT

A seat for a vehicle comprises a seat cushion, a seat back, a headrest having a neck-support portion, a headrest pole member to support the headrest, and a rotational support device. The rotational support device supports the headrest in such a manner that the neck-support portion of the headrest is rotated around a rotational axis that extends in substantially a width direction of the seat back and held at a specified angle relative to the seat back, wherein the headrest is its lowest position, the neck-support portion of the headrest is configured to be allowed to be rotated forward from its rearmost stored position by the rotational support device. Accordingly, a neck portion of a passenger can be supported by the neck-support portion of the headrest properly.

16 Claims, 18 Drawing Sheets

U.S. PATENT DOCUMENTS

| | | | |
|---|---|---|---|
| 7,044,555 B2 * | 5/2006 | Saberan | 297/408 |
| 7,152,927 B1 * | 12/2006 | Halstrom | 297/408 |
| 7,410,218 B2 * | 8/2008 | Kotani et al. | 297/408 |
| 2003/0098596 A1 * | 5/2003 | Andreasson et al. | 297/61 |
| 2004/0026964 A1 * | 2/2004 | Edrich et al. | 297/61 |
| 2004/0262971 A1 * | 12/2004 | Hentges et al. | 297/378.12 |
| 2007/0152487 A1 * | 7/2007 | Brockman et al. | 297/408 |

FOREIGN PATENT DOCUMENTS

| | | |
|---|---|---|
| EP | 0113645 A2 | 7/1984 |
| JP | 2004-155269 | 6/2004 |
| JP | 2005-065836 | 3/2005 |
| JP | 2005-065836 A | 3/2005 |

\* cited by examiner

SEAT FOR VEHICLE

BACKGROUND OF THE INVENTION

The present invention relates to a seat for a vehicle, and in particular, relates to a seat for a vehicle equipped with a headrest.

A seat of an automotive vehicle is generally equipped with the headrest to support or hold a head portion of a passenger. Thus, the passenger feels comfortable with the headrest when seated in the seat. The headrest also performs holding of the head portion of the passenger more effectively at a quick acceleration or deceleration driving of the vehicle.

Recently, a reverse-L shaped headrest, a so-called saddle type of headrest has been used, whose upper portion is supported by a pole member so as to be movable vertically and whose lower portion extends forward and downward. The seat for a vehicle equipped with this saddle type of headrest has an advantage of providing a properly-clear rear view to the driver when the seat is applied to a rear seat of the vehicle. Namely, the headrest may be used by the passenger in such a manner that it is pulled up to its use position when being used and pushed down to its lowest position when being not used. When the seat is applied to an assistant seat, meanwhile, the headrest may not be an obstacle to a properly-clear side view of the driver.

An exemplified seat with the saddle type of headrest is disclosed in Japanese Patent Laid-Open Publication No. 2005-65836. The headrest of the seat for a vehicle disclosed here is configured such that its longitudinal angle is adjustable by an electronic drive mechanism provided in a seat cushion, although the headrest is a fixed type that is not movable vertically without the above-described advantage.

In the case where the seat for a vehicle is equipped with the saddle type of headrest that is movable vertically by the pole member provided at the seat back, the passenger may need to hold (grip) part of the headrest to pull up when it is required that the headrest is pulled up from its lowest position to its use position.

However, since the headrest is generally configured such that a rear face of a lower portion of the headrest is located near a front face of the seat back when the headrest is in its lowest position. Therefore, it may not be easily for the passenger to hold part of the headrest and thus the operation by the passenger may be troublesome. Also, for example, in the case where a lower end portion of the headrest is held (gripped) and pulled upward, since there may exist no proper gap near the lower end portion of the headrest, the operation may be troublesome likewise.

Meanwhile, Japanese Patent Laid-Open Publication No. 2004-155269 discloses a seat with a saddle type of headrest that is of a reverse-L shape, when viewed from the side, in which the headrest is biased rearward as it is moved upward from its stored position at an upper portion of a seat back so that a front face of the headrest can be located in the same position of a front face of the seat back.

In this seat, the headrest is configured such that its lower end portion cannot be rotated further forward from its stored position at the upper end of the seat back. Therefore, the lower end portion of the headrest may be not used as a portion to support the neck portion of the passenger.

SUMMARY OF THE INVENTION

The present invention has been devised in view of the above-described problems, and an object of the present invention is to provide a seat for a vehicle that can support the neck portion of the passenger properly. Another object of the present invention is to provide a seat for a vehicle in which the headrest can be easily pulled upward to its use position from its lowest position.

According to the present invention, there is provided a seat for a vehicle, comprising a seat cushion having a passenger-support face, a seat back having a passenger-support face, the seat back being pivotally attached to the seat cushion via a hinge mechanism, a headrest having a neck-support portion, the neck-support portion being provided to extend downward and operative to support a neck portion of a passenger, a headrest pole member to support the headrest, the headrest pole member being provided at the seat back so as to move a position of the headrest between a lowest position and an upward-pulled position, wherein when the headrest is in the lowest position, a lower end portion of the neck-support portion of the headrest is located below a top portion of the seat back in an upright-use position, and a rotational support device provided between the headrest and the headrest pole member, the rotational support device being operative to support the headrest in such a manner that at least the neck-support portion of the headrest is rotated around a rotational axis that extends in substantially a width direction of the seat back and held at a specified angle relative to the seat back, wherein when the headrest is the lowest position, at least the neck-support portion of the headrest is configured to be allowed to be rotated forward from a rearmost stored position thereof by the rotational support device.

According to the present invention, since at least the neck-support portion is configured to be rotated forward from its rearmost stored position, the neck portion of the passenger can be properly supported by the neck-support portion, even for a small passenger. And, the headrest can be easily pulled upward to its use position from its lowest position. Herein, since the lower end portion of the neck-support portion of the headrest in the lowest position is located below the top portion of the seat back in the upright-use position, the headrest may not prevent a full-flat arrangement of the seat.

According to an embodiment of the present invention, the seat is configured such that the seat back can be rotated forward and folded on the seat cushion in such a manner that the passenger-support faces of the seat back and the seat cushion are substantially in parallel to each other. Thereby, the full-flat arrangement of the seat can be attained.

According to another embodiment of the present invention, the neck-support portion is configured to have a relatively-thick lower portion and a relatively-thin upper portion. Thereby, the function of supporting the neck portion can be properly improved.

According to another embodiment of the present invention, when the seat back is rotated forward and folded on the seat cushion in such a manner that the passenger-support faces of the seat back and the seat cushion is substantially in parallel to each other, a gap formed between the passenger-support faces of the seat back and the seat cushion at a portion that is near the hinge mechanism is larger than that at another portion that is away from the hinge mechanism. Thereby, designing of making a back face of the seat back properly flat can be facilitated.

According to another embodiment of the present invention, the passenger-support face of the seat back is configured to have a recess in such a manner that a central portion thereof is recessed compared to both-side portion thereof, and at least part of the neck-support portion of the headrest that is in the lowest position is located in the recess of the passenger-support face of the seat back when the seat back is rotated forward and folded on the seat cushion. Thereby, the parallel-arrangement of the passenger-support faces can be attained properly without improper influence of the headrest. Also, when the thickness of the lower end portion of the neck-support portion is configured to be greater than that of its upper portion, the passenger can easily hold (grip) this thicker lower end portion and pull the neck-support portion out of the recess of the seat back for the support of the neck.

According to another embodiment of the present invention, the passenger-support face of the seat cushion is configured to have a recess, and at least part of the neck-support portion of the headrest that is in the lowest position is located in the recess of the passenger-support face of the seat cushion when the seat back is rotated forward and folded on the seat cushion. Thereby, the parallel-arrangement of the passenger-support faces can be attained properly without deteriorating a sitting feeling of the seat cushion.

According to another embodiment of the present invention, the neck-support portion of the headrest is formed separately from a main body of the headrest that is operative to support a head portion of the passenger, the headrest pole member supports the main body of the headrest, and supports the neck-support portion of the headrest is supported by the rotational support device so as to rotate relative to the main body of the headrest. Thereby, when the neck-support member is rotated forward from the main body, the head of the passenger can be properly supported at a recess portion that is formed with the neck-support member and the main body. Thus, an improper lateral movement of the head during a traveling of the vehicle can be prevented.

According to another embodiment of the present invention, the seat is configured such that the seat back is rotated forward and folded on the seat cushion in a full-flat state via the hinge mechanism in such a manner that an angle between the passenger-support faces of the seat back and seat cushion is smaller than a specified narrow angle. Thereby, the present invention is also applicable to the seat for a vehicle in which the seat back is made in the full-flat sate by using the hinge mechanism, other than a fixed type of seat for a vehicle in which the seat back is fixed in the upright position.

According to another embodiment of the present invention, when the neck-support portion of the headrest is in the rearmost stored position, a back face of the neck-support portion contacts an upper portion of the passenger-support face of the seat back. Thereby, since at least the neck-support portion of the headrest is rotatable around the rotational axis even when the headrest is in the lowest position with its back face contacting the upper portion of the passenger-support face of the seat back, the passenger can pull up the headrest to the use position easily after rotating forward the neck-support portion from its rearmost stored position. Also, when the full-flat arrangement of the seat is required, the passenger-support face of the seat back can be located as close to the passenger-support face of the seat cushion as possible, and thereby the back face of the seat back can be made more horizontal.

According to another embodiment of the present invention, the neck-support portion is configured to have a relatively-thin lower portion and a relatively-thick upper portion. Thereby, the thickness of the neck-support portion of the headrest becomes thinner toward its lower end portion, the passenger can easily hold the lower end portion of the neck-support portion and then rotate it forward. Thus, the passenger can easily pull up the headrest to the use position. Also, the headrest can be disposed within a space formed between the seat cushion and the seat back in the full-flat state, thereby facilitating the full-flat arrangement. Namely, the back face of the seat back can be made more horizontal.

According to another embodiment of the present invention, the seat back is configured to have a standard position where a center line of the seat back is slightly inclined rearward relative to a vertical line by a specified angle, and the headrest pole member is configured to have an extension line thereof that is inclined relative to the center line of the seat back in the standard position toward the vertical line by a specified angle. Thereby, since the headrest in the use position is disposed to be inclined toward the vertical direction by the angle relative to the standard position of the seat back that has the rearward-inclined angle, the head and/or neck portion of the passenger can be properly supported. Also, since the headrest is pulled upward from the lowest position to the use position by the pole member with the inclined angle relative to the seat back, the pulling angle is close to the vertical direction. Thus, a smooth pulling operation can be obtained.

According to another embodiment of the present invention, the top portion of the seat back is configured to allow a forward-rotation of the neck-support portion by the rotational support device. Thus, the passenger can rotate the neck-support portion of the headrest easily in the lowest position of the headrest and thereby pull up the headrest to the use position.

According to another embodiment of the present invention, the rotational support device further comprises a friction mechanism operative to provide a pressing force within a range of 30 to 150 N to suppress a rotation of the neck-support portion of the headrest and hold the neck-support portion with the pressing force. Thereby, the passenger can set the proper position of the neck-support portion with an easy operation.

According to another embodiment of the present invention, the rotational support device further comprises a ratchet mechanism operative to allow only the forward-rotation of the neck-support portion of the headrest in a specified range, the neck-support portion that has been rotated forward beyond the specified range being allowed to be rotated rearward. Thereby, since only the forward-rotation of the neck-support portion of the headrest is allowed in the specified range, the rearward movement of the head and/or neck portion of the passenger can be supported properly by the neck-support portion of the headrest. Further, since the neck-support portion that has been rotated forward beyond the specified range is also allowed to be rotated rearward, the passenger can set the proper position of the neck-support portion in the longitudinal direction with a simple and easy operation.

According to another embodiment of the present invention, the seat back is configured to be rotated forward via the hinge mechanism provided at a rear portion of the seat cushion with an operation from behind the seat, and a rear end portion of the headrest includes a portion that the passenger can hold from behind the seat when the headrest is in the lowest position. Thereby, since the rear end portion of the headrest includes the portion that the passenger can hold from behind the seat when the headrest is in the lowest position, when the full-flat arrangement of the seat with an operation of forward rotating of the seat back is required, the passenger can easily move the neck-support portion from the forward position to the rearmost stored position by holding the above portion from behind the seat before the above operation. Thus, transition to the full-flat state of the seat can be facilitated.

According to another embodiment of the present invention, the above portion that the passenger can hold from behind the seat is provided behind the rotational axis around which the neck-support portion of the headrest is rotated. Thereby, the passenger can easily move the neck-support portion from the forward position to the rearmost stored position by holding (gripping) the above portion from behind the seat.

According to another embodiment of the present invention, the headrest is configured so as to be recognized from behind the seat that the lower end portion of the headrest is in a forward-rotated position when the headrest is in the lowest position. Thereby, the passenger can easily move the neck-support portion from the forward position to the rearmost stored position by holding the above portion from behind the seat.

Other features, aspects, and advantages of the present invention will become apparent from the following description which refers to the accompanying drawings.

DETAINED DESCRIPTION OF THE INVENTION

Figure 1:
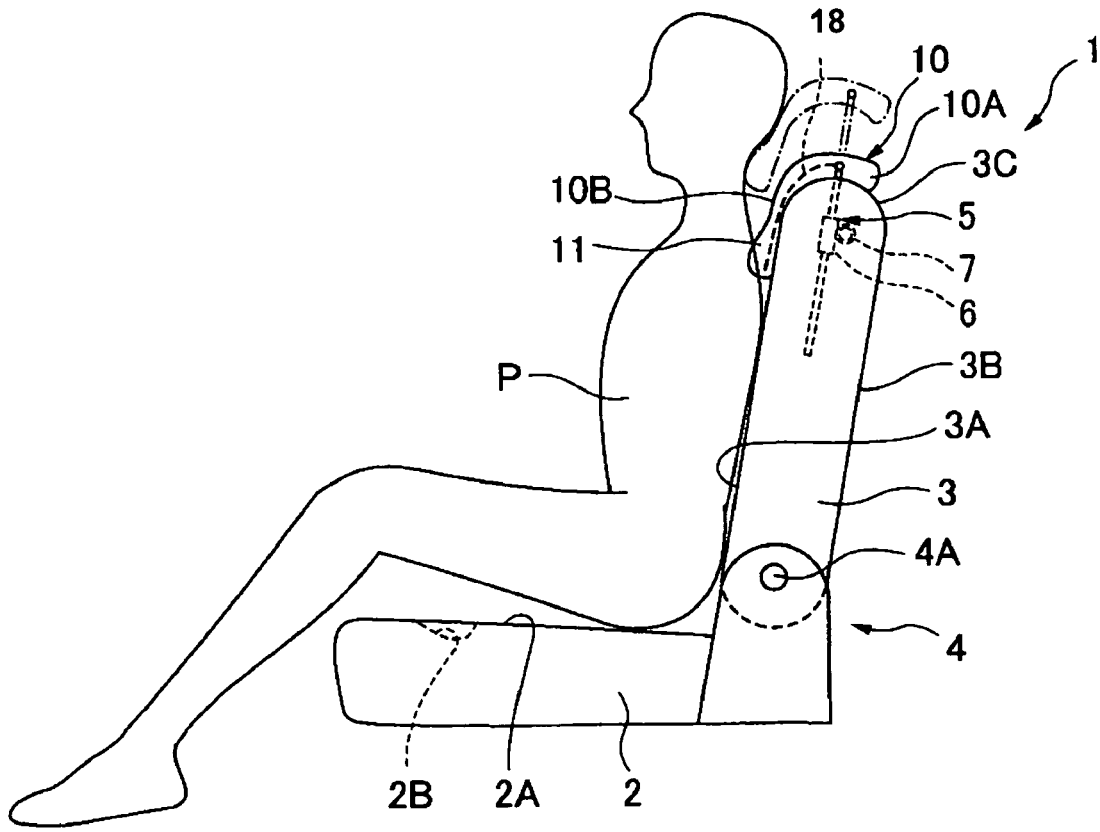
FIG. 1 is a schematic side view of a seat for a vehicle of an embodiment 1 according to the present invention.

Hereinafter, preferred embodiments of a seat for a vehicle according to the present invention will be described referring to the accompanying drawings. It should be understood that even though embodiments are separately described, single features may be combined to additional embodiments.

Embodiment 1

An embodiment 1 of the seat for a vehicle will be described referring to FIGS. 1 through 5. The seat of the embodiment 1, which is denoted by a reference number 1 in these figures as a whole, comprises a seat cushion 2 and a seat back 3 that is pivotally attached to the seat cushion 2 via a hinge mechanism 4.

Figure 2:
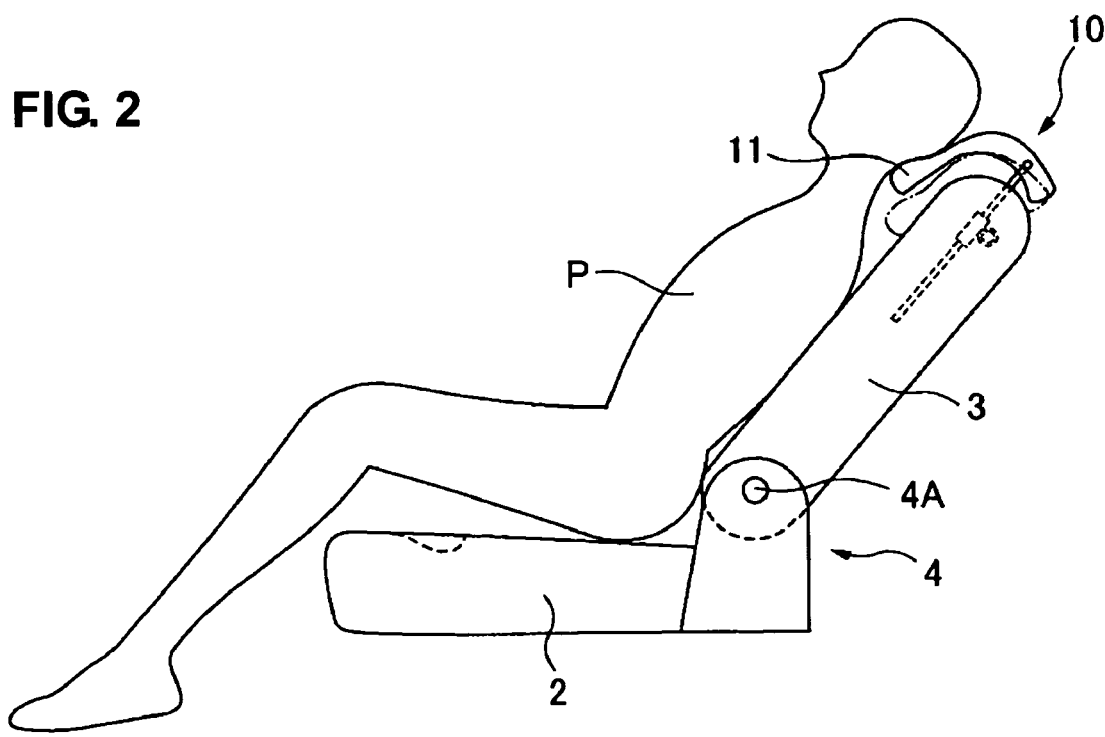
FIG. 2 is a schematic side view of the seat, shown in FIG. 1, in which a seat back is reclined and a headrest is moved upward.
Figure 3:
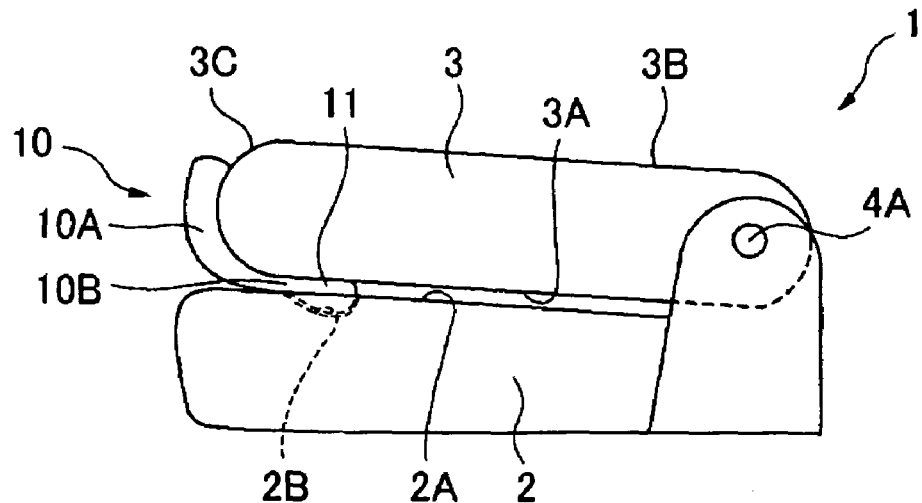
FIG. 3 is a schematic side view of the seat, shown in FIG. 1, in which the seat back is rotated forward.

The hinge mechanism 4, which is comprised of a conventional knuckle structure, constitutes a reclining mechanism that allows a rearward rotation of the seat back 3 around a rotational axis 4A of the hinge mechanism 4 by an operation of a lever (not illustrated) and then holds it in any position as shown in FIG. 2. The hinge mechanism 4 also allows the seat back 3 to be rotated forward around the rotational axis 4A and folded on the seat cushion 2 in such a manner that a passenger-support face 2A of the seat cushion 2 and a passenger-support face 3A of the seat back 3 are substantially in parallel to each other as shown in FIG. 3. This state will be called "full-flat state." When the seat back 3 is in the full-flat state, a back face 3B of the seat back 3 forms a substantially flat face with a floor of a baggage compartment (not illustrated), and thereby an enlarged cargo space can be provided. Herein, it is preferable that the back face 3B of the seat back 3 be flat.

A headrest pole member 5 is provided at the seat back 3 so that it can extend upward from a top portion 3C of the seat back 3.

A pair of guide holes (not illustrated), which extends downward from the top portion 3C, is formed at the seat back 3, and a guide sleeve 6 is disposed in each guide hole. Each guide sleeve 6 is supported at a support member 7 that is fixed to a support frame (not illustrated) inside the seat back 3.

Figure 4:
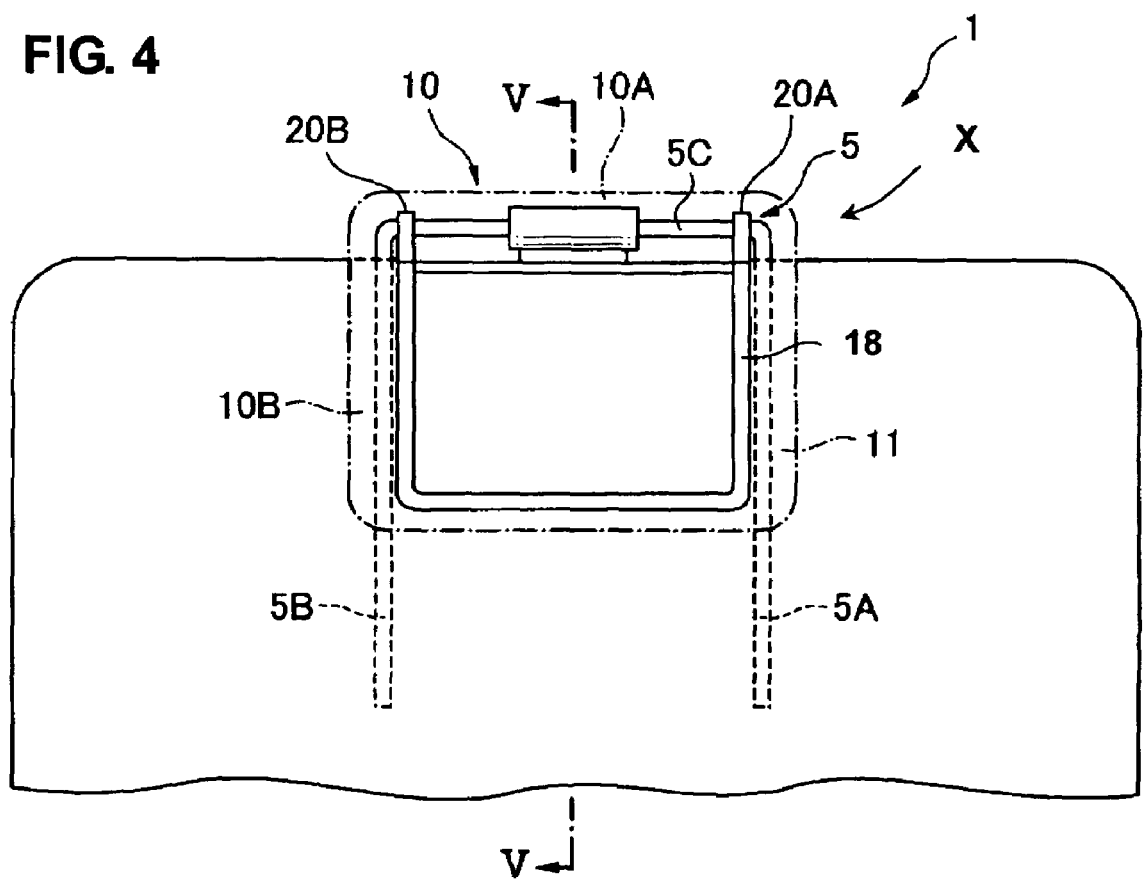
FIG. 4 is a partial schematic elevation view of the seat, showing an internal structure of the headrest.

As apparent from FIG. 4, the headrest pole member 5 is of a U shape as a whole and comprises a pair of poles 5A, 5B and a horizontal axis 5C that extends between the poles 5A, 5B. These poles 5A, 5B of the headrest pole member 5 are received in the guide holes (not illustrated) and the guide sleeves 6 so that they can slide in them. Also, these poles 5A, 5B are operative to be locked by a conventional slide holding mechanism (not illustrated), so their position can be held at any position above the top portion 3C of the seat back 3.

A headrest 10 is attached to the headrest pole member 5. The headrest 5 comprises an upper base portion 10A and a support portion 10B. Inside the upper base portion 10A are disposed the horizontal axis 5C of the headrest pole member 5 and part of the poles 5A, 5B. The support portion 10B is formed so as to extend downward form a front portion of the upper base portion 10A. Hereinafter, words of "upper" or "lower" will be used basically to mean a direction in a standard state in which the seat is in an upright use position like one shown in FIGS. 1 and 2.

The headrest is of a reverse-L shape as a whole, when viewed from the side, which is apparent from FIGS. 1 through 3, and of a rectangular shape, when viewed from the front, as shown in FIG. 4. The support portion 10B of the headrest 10 constitutes a neck-support portion 11 to support a neck portion of a passenger. This neck-support portion 11 is configured to have a relatively-thick lower portion and a relatively-thin portion. Because the neck portion of the passenger can be supported properly by the neck-support portion 11.

As apparent from FIGS. 1 and 4, inside the headrest 10 is disposed a circular-shaped headrest frame 18 that extends along a peripheral portion of the headrest 10. The seat 1 comprises a rotational support device X that supports the upper base portion 10A of the headrest 10 in such a manner that the headrest 10 is rotated around a rotational axis extending in the width direction of the seat 1 and held at a specified angle. In the present embodiment, this rotational axis is comprised of the horizontal axis 5C of the headrest pole member 5.

Figure 5:
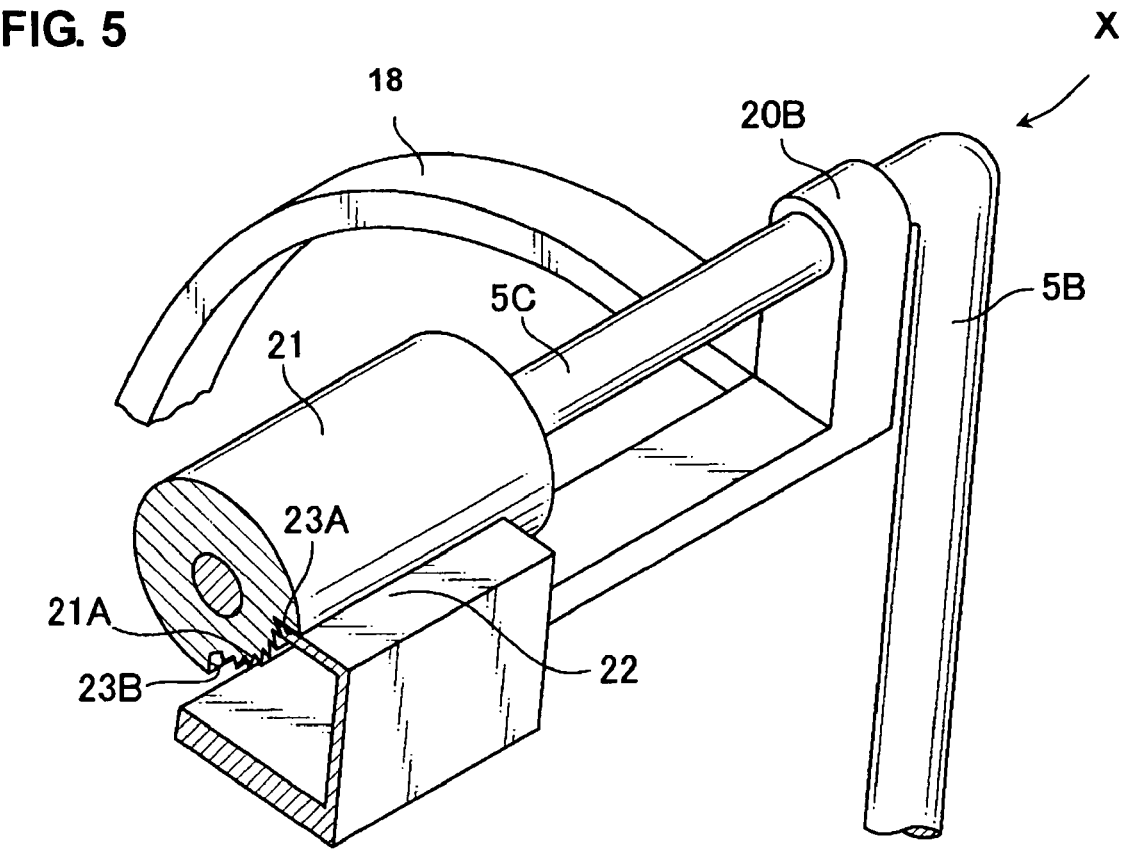
FIG. 5 is a partial schematic perspective view of the seat, showing an internal structure of the headrest.

The rotational support device X, as shown in FIG. 5, comprises a pair of journals 20A, 20B that extends from the headrest frame 18 of the headrest 10 and is pivotally supported at the horizontal axis 5C of the headrest pole member 5. Thus, the headrest 10 can be rotated around the horizontal axis 5C disposed inside the upper base portion 10A.

The rotational support device X also comprises a ratchet mechanism. The ratchet mechanism includes a pawl wheel 21 that is fixed to the horizontal axis 5C between the pair of journals 20A, 20B and has a plurality of pawls 21A thereon, and a pawl member 22 that extends from the headrest frame 18 of the headrest 10 and has pawls to selectively engage with the pawls 21A of the pawl wheel 21. The headrest 10 can be held at a specified angle relative to the horizontal axis 5C according to an engagement position of the pawls of the ratchet mechanism.

Thus, a rotational range of the headrest 10 relative to the headrest pole member 5, namely the seat back 3 is determined by an area of the pawls 21a continuously formed on the pawl wheel 21, which has a first terminal end 23A and a second terminal end 23B. In the present embodiment, the first terminal end 23A is positioned such that a lower end of the support portion 10B of the headrest 10 is not rotated rearward beyond an upper end of the passenger-support face 3A of the seat back 3 (and an imaginary line extending along the passenger-support face 3A beyond this upper end). Thus, the lower end of the support portion 10B of the headrest 10 is properly prevented from contacting the top portion 3C of the seat back 3 when the headrest 10 is pushed downward at the seat back 3 in the upright-use position.

As apparent from FIG. 1, the headrest 10 is configured such that when the headrest 10 is in a lowest position where it is pulled down to its lowest position, a lower end portion of the neck-support portion 11 is located below the top portion 3C of the seat back 3 in the upright-use position. Thereby, the amount of an upward projection of the headrest 10 from the seat back 3 can be made small. Accordingly, when the seat back 3 is rotated forward and folded on the seat cushion 2 to provide the full-flat state, the seat back 3 can be prevented properly from interfering with a front-located seat, without a necessity of removing the headrest 10 from the seat back 3. In the case where the seat 1 is a foremost seat, the seat back 3 can be prevented properly from interfering with an instrument panel or the like.

Also, a passenger seated in a front seat can be provided with a properly-clear rear view beyond the headrest 10 with the small amount of projection from the seat back 3. Likewise, in the case where the seat 1 is a foremost seat, a passenger seated in a rear seat can be provided with a proper front view.

Further, since the neck-support portion 11 can be located at a lower level, a neck portion of a small person like a child can be supported properly. It is preferable that the lower end portion of the neck-support portion 11 be positioned 20 to 40 cm below the top portion 3C of the seat back 3 when the seat back 3 is set to be 80 to 85 cm from the bottom to the top portion 3C. Also, since the passenger-support face 3A of the seat back 3 of the present embodiment is configured to have no recess for receiving a rear edge portion of the neck-support portion 11 thereon when the headrest 10 is in the lowest position as shown in FIG. 1, the seat back 3 can ensure a sufficient thickness of cushion.

There is provided a recess portion 2B formed on the passenger-support face 2A of the seat cushion 2. This is a recess operative to receive therein the neck-support portion 11 as shown in FIG. 3 when the headrest 10 is located in the state (hereinafter, referred to as "headrest lowest-stored state") where the headrest 10 is pulled down to the lowest position (namely, the upper base portion 10A comes to contact the top portion 3C of the seat back 3) and the support portion 10B of the headrest 10 contacts the passenger-support face 3A of the seat back 3, and when the seat back 3 is rotated forward and folded on the seat cushion 2 in such a manner that the passenger-support faces 2A, 3A of the seat cushion 2 and seat back 3 are substantially in parallel to each other. This recess portion 2B receiving the neck-support portion 11 therein promotes properly this parallel-arrangement of the faces 2A, 3A of the seat 1.

Herein, the back face of the support portion 10B of the headrest 10 is configured to correspond to a shape of the passenger-support face 3A in the headrest lowest-stored state so that it can be properly avoided that the headrest 10 interferes with the passenger-support face 2A of the seat cushion 2 when the seat back 3 is in the full-flat state. Also, the back face of the upper base portion 10A of the headrest 10 is configured to correspond to a shape of the top portion 3C of the seat back 3 so that the thickness of the headrest 10 that projects upward from the seat back 3 can be made properly small when the headrest 10 is in the lowest position.

Next, operations of the seat 1 with the above structure will be described. When the neck portion of a passenger P should be supported by the headrest 10 in the headrest lowest-stored state as shown by a solid line in FIG. 1, the headrest pole member 5, namely the headrest 10 attached to the headrest pole member 5 is first pulled upward against a sliding resistance of the slide holding mechanism, not illustrated, to a proper position supporting the neck portion of the passenger P and then held at this position.

When the neck portion of the passenger P should be supported by the headrest 10 in the state where the seat back 3 is in the rearward-inclined position as shown in FIG. 2, the seat back 3 is first rotated to a desirable position by the operation of the reclining mechanism 4. Then, as described above, the neck-support portion 11 of the headrest 10 is moved to a proper position to support the neck portion of the passenger P and held at this position.

Subsequently, the headrest 10 is rotated clockwise in FIG. 2 around the horizontal axis 5C of the headrest pole member 5 to a proper position to support the neck portion of the passenger P with the neck-support portion 11. Herein, when a force is applied to the headrest 10 to rotate the headrest 10 clockwise in FIG. 2, the pawl member 22 of the headrest frame 18 of the headrest 10 is moved in an arc shape around the horizontal axis 5C of the headrest pole member 5 from the first terminal end 23A toward the second terminal end 23B. And, when application of the force is taken off, the pawl member 22 engages with the pawls 21A of the pawl wheel 21 and thereby the headrest 10 is held at this position with a certain angle relative to the horizontal axis 5C. It is preferable that the ratchet mechanism be configured such that a force within a range of 30 to 100 N is required to rotate the headrest 10.

Embodiment 2

An embodiment 2 of the seat for a vehicle will be described referring to FIGS. 6 and 7.

Figure 6:
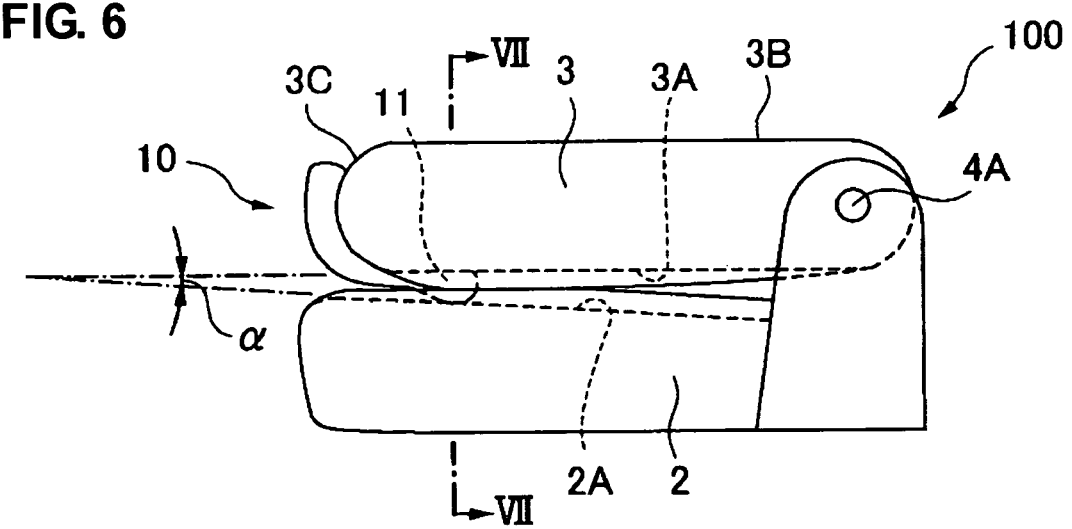
FIG. 6 is a schematic side view of a seat for a vehicle of an embodiment 2 according to the present invention, in which a seat back is rotated forward.
Figure 7:
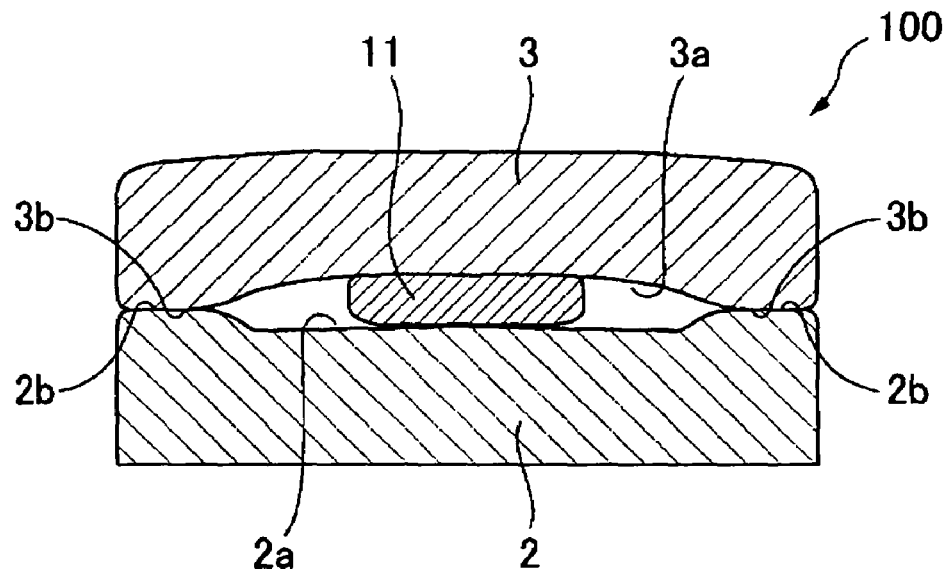
FIG. 7 is a sectional view taken along line V-V of FIG. 6.

A seat 100 of the embodiment 2 shown in FIGS. 6 and 7 has a similar structure to the seat 1 of the embodiment 1. Accordingly, only different portions will be described, omitting descriptions of the same portions. Herein, the same portions of the seat 100 as the embodiment 1 are denoted by the same reference numerals used for the seat 1.

A first difference is that the rotational axis 4A of the hinge mechanism 4 of the seat 100 is located at a higher position than the rotational axis 4A of the seat 1. Thereby, when the seat back 3 is rotated forward until the full-flat state, a gap formed between the passenger-support faces 2A, 3A of the seat cushion 2 and seat back 3 at a portion that is near the rotational axis 4A of the hinge mechanism 4 is slightly larger than that at another portion that is away from the rotational axis 4A. Thereby, the back face 3B of the seat back 3 may be positioned more horizontally than the seat 1 of the embodiment 1, so a further proper flat face can be formed with the floor of the baggage compartment of the vehicle.

A second deference is that, instead of the recess portion 2B formed on the seat cushion 2 of the embodiment 1, as shown in FIG. 7, the passenger-support face 3A of the seat back 3 is configured to have a recess in such a manner that a central portion 3a is recessed compared to both-side portions (seat-back side support portions) 3b, and likewise the passenger-support face 2A of the seat cushion 2 is configured to have a recess in such a manner that a central portion 2a is recessed compared to both-side portions (seat-cushion side support portions) 2b.

Thereby, the parallel-arrangement of the passenger-support faces 2A, 3A can be attained properly without improper influence of the headrest 10. Namely, a sufficient thickness of the neck-support portion 11 can be ensured, maintaining the parallel-arrangement of the passenger-support faces 2A, 3A, thereby providing a desirable support of the neck portion.

Alternatively, the above recess formed on the passenger-support faces 2A or 3A of the seat cushion 2 or the seat back 3 may be formed only at a portion on the passenger-support face 2A or 3A that corresponds to the neck-support portion 11 of the headrest 10 in the headrest lowest-stored state.

Herein, since the rotational axis 4A of the hinge mechanism 4 of the seat 100 is located at the higher position, an angle a formed between the passenger-support faces 2A, 3A is about 10 degrees. In this description, however, "substantially in parallel" that describes the arrangement of the passenger-support faces 2A, 3A may mean that angle of 20 degrees or less.

Embodiment 3

An embodiment 3 of the seat for a vehicle will be described referring to FIG. 8.

Figure 8:
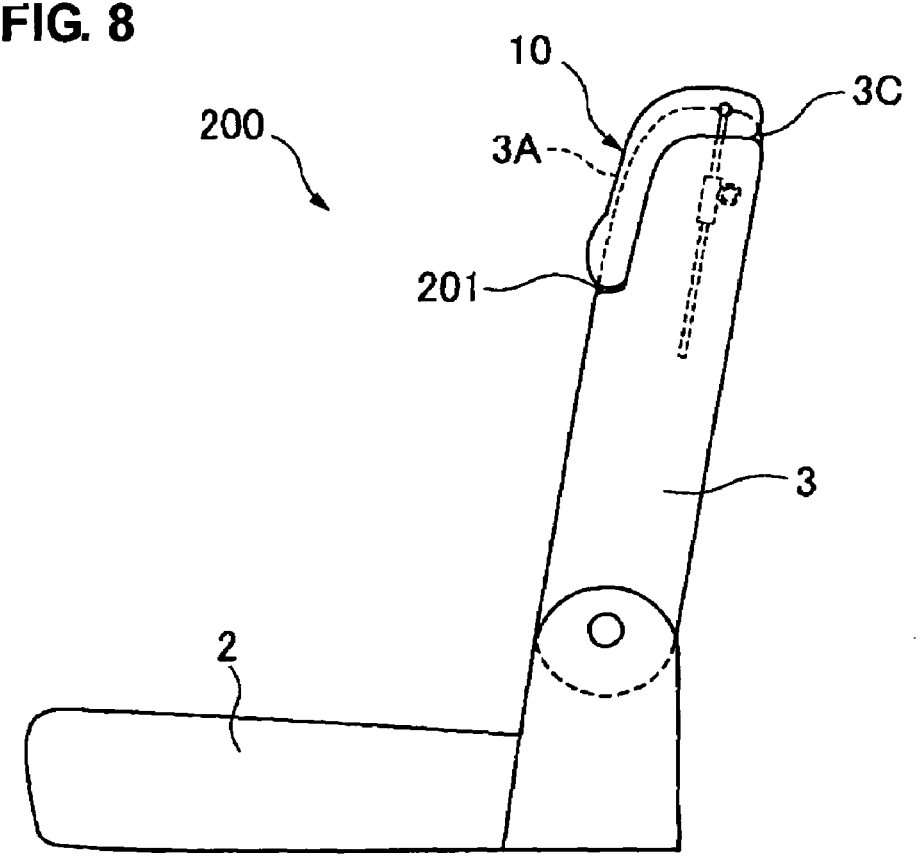
FIG. 8 is a schematic side view of a seat for a vehicle of an embodiment 3 according to the present invention.

A seat 200 of the embodiment 3 shown in FIG. 8 has a similar structure to the seat 1 of the embodiment 1. Herein, part of the passenger-support face 3A and the top portion 3C of the seat back 3 is cut off to form a store-cut-off portion 201 for storing part (inner-edge portion) of the headrest 10, which is an only difference from the seat 1 of the embodiment 1. Forming of the store-cut-off portion 201 at the seat back 3 can reduce the amount of projection of the headrest 10 in the headrest lowest-stored state forward and upward from the passenger-support face 3A of the seat back 3 as much as possible. Namely, the parallel-arrangement of the passenger-support faces 2A, 3A can be attained properly without improper influence of the neck-support portion (thickness) projecting forward from the passenger-support face 3A. Also, the neck-support portion can be properly prevented from interfering with the front seat located before, thereby providing the full-flat state appropriately.

Embodiment 4

An embodiment 4 of the seat for a vehicle will be described referring to FIGS. 9 through 12. A seat 300 of the embodiment 4 also has a similar structure to the seat 1 of the embodiment 1. Accordingly, only different portions will be described, omitting descriptions of the same portions. Herein, the same portions of the seat 300 as the embodiment 1 are denoted by the same reference numerals used for the seat 1.

Figure 9:
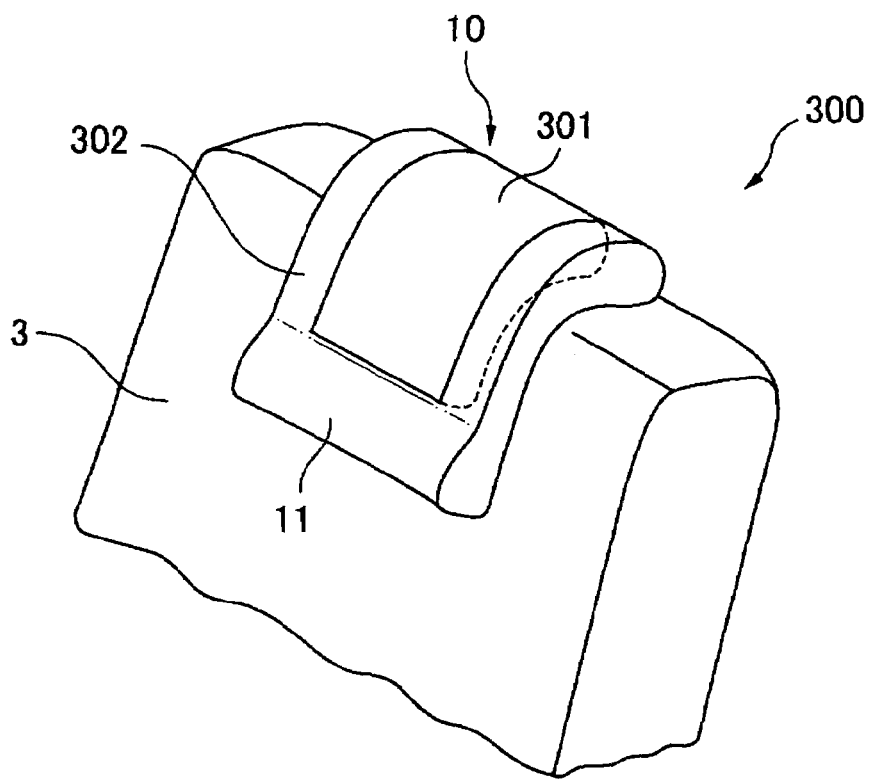
FIG. 9 is a partial schematic perspective view of a seat for a vehicle of an embodiment 4 according to the present invention.

As shown in FIG. 9, although the seat 300 has the similar-shaped headrest 10 to the seat 1 as a whole, the headrest 10 of the seat 300 comprises a main body 301 and a neck-support member 302 that is formed separately from the main body 301, which is different from the headrest 10 of the seat 1.

The main body 301 is fixed to the headrest pole member 5, without a rotation around the horizontal axis 5C, and thereby the main body 301 is configured to move only vertically with the headrest pole member 5.

The neck-support member 302, which is of a U shape when viewed from the front, is supported by a rotational-support device Y so as to be rotated around the rotational axis extending in the width direction of the seat 300 at an upper portion of the main body 301 and held at a specified angle relative to the rotational axis. A lower edge portion of the neck-support member 302 constitutes the neck-support portion 11 of the seat 1.

Figure 10:
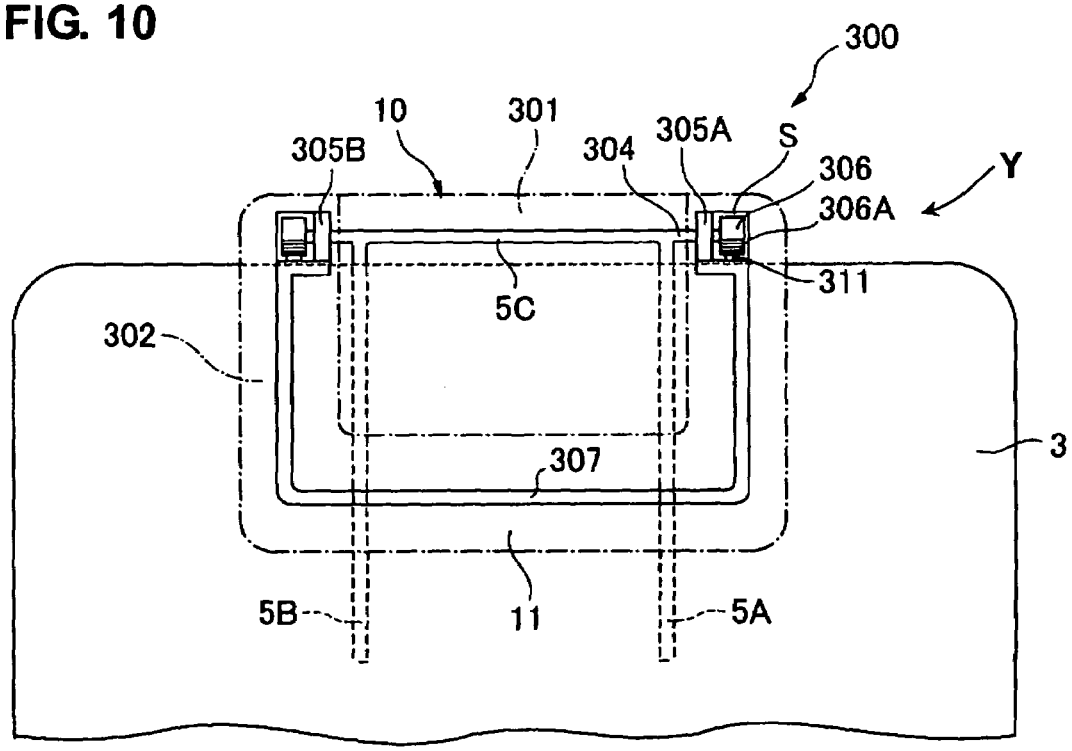
FIG. 10 is a partial schematic elevation view of the seat, shown in FIG. 9, showing an internal structure of a headrest.

The rotational-support device Y, as shown in FIG. 10, comprises a rotational axis 304 that extends outward from each end of the horizontal axis 5C of the headrest pole member 5 and coaxially to the axis 5C and a pawl wheel 306 that is attached to the rotational axis 304 coaxially.

The neck-support member 302 includes a neck-support frame 307 therein that is of a U shape when viewed from the front. At each end of this U-shaped neck-support frame 307 are provided respective journals 305A, 305B that are pivotally attached to the rotational axis 304 extending from the headrest pole member 5. Thereby, the neck-support member 302 can be rotated around the rotational axis 304 (5C)

Part of the rotational axis 304 and the pawl wheel 306 are accommodated in an inner space S that is formed inside the neck-support member 302. The pawl wheel 306 has a plurality of pawls 306A on part of the wheel 306. The neck-support frame 307 has a pawl 311 that selectively engages with one of the pawls 306A of the pawl wheel 306. The neck-support member 302 can be held at a specified angle relative to the rotational axis 304 according to an engagement position of the pawls 311, 306A. A rotational range of the neck-support member 302 is restricted by an area where the pawls 306A are formed on the pawl wheel 21, which is similar to the ratchet mechanism of the seat 1.

Operations of the seat 300 with the above structure will be described.

Figure 11:
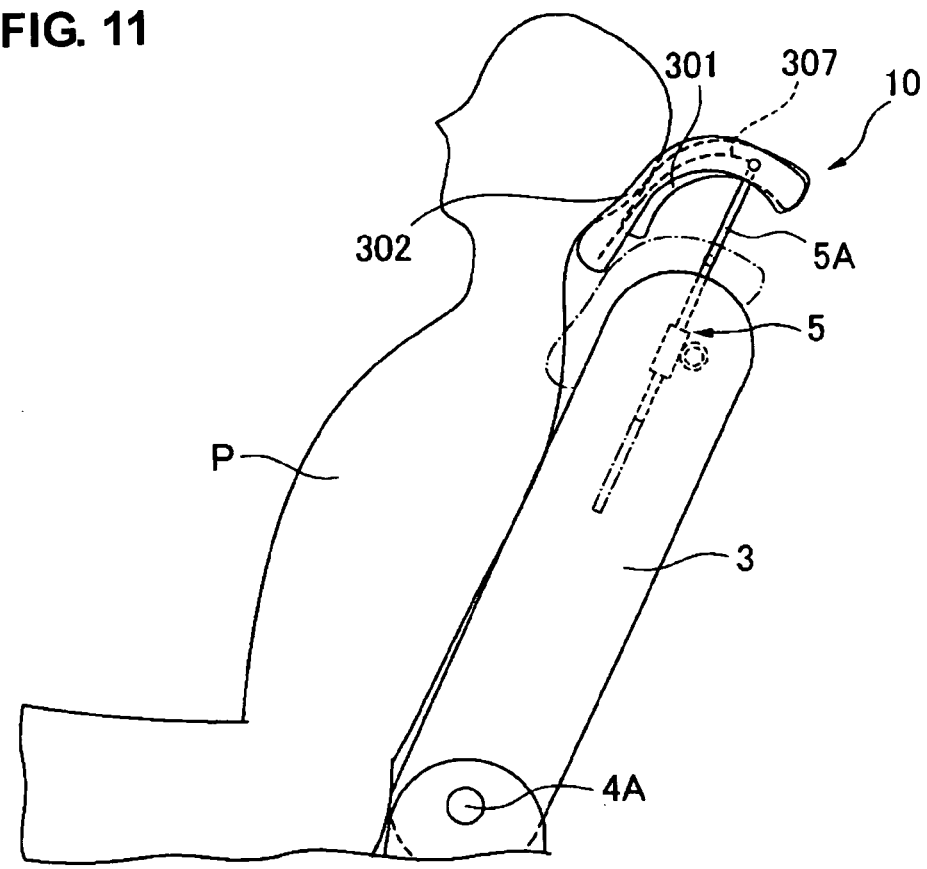
FIG. 11 is a partial schematic side view of the seat, shown in FIG. 9, in which the headrest is moved upward.
Figure 12:
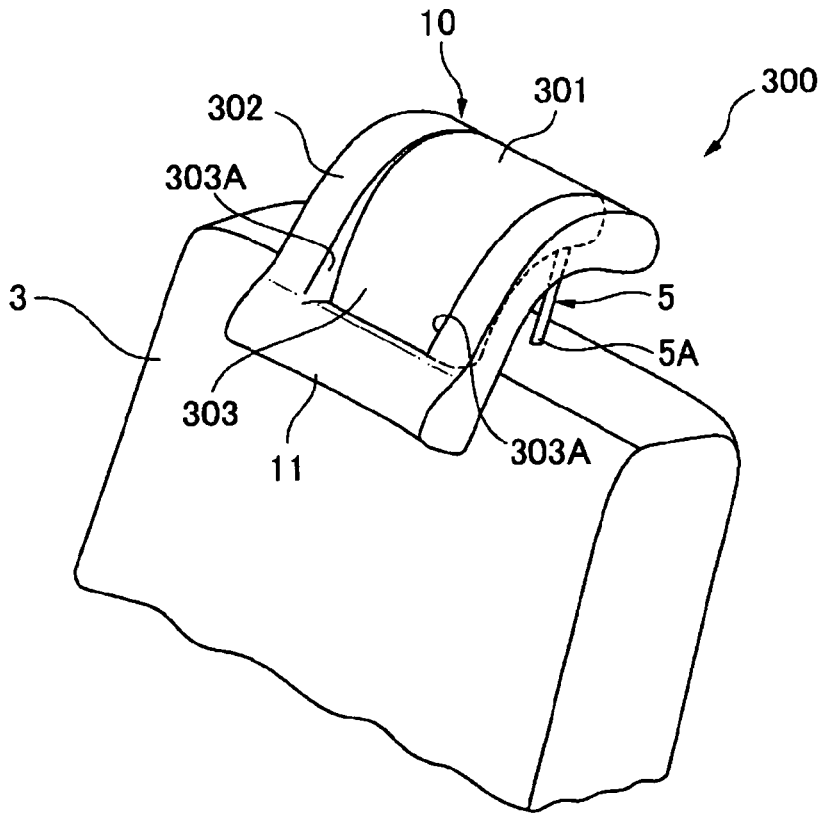
FIG. 12 is a partial schematic perspective view of the seat, shown in FIG. 9, in which the headrest is moved upward and a neck-support member is rotated forward.

When the neck portion of a passenger P should be supported by the headrest 10 in the headrest lowest-stored state as shown by a broken line in FIG. 11, the headrest pole member 5, namely the headrest 10 attached to the headrest pole member 5 is first pulled upward against the sliding resistance of the slide holding mechanism (not illustrated), which has been described for the seat 1, to a proper position supporting the neck portion of the passenger P and then held at this position.

Subsequently, the neck-support member 302 is rotated clockwise in FIG. 11 around the horizontal axis 5C of the headrest pole member 5, the rotational axis 304, to a proper position to support the neck portion of the passenger P with the neck-support portion 11. Herein, when a force is applied to the neck-support member 302, the pawl 311 of the neck-support frame 307 of the neck-support member 302 is moved in an arc shape along the pawls 306A of the pawl wheel 306 around the horizontal axis 5C of the headrest pole member 5, the rotational axis 304. And, when application of the force is taken off, the pawl 311 engages with the pawls 306A of the pawl wheel 21 and thereby the neck-support member 302 is held at this position with a certain angle relative to the horizontal axis 5C, the rotational axis 304.

When the neck-support member 302 is rotated forward relative to the main body 301, a recess portion 303 is formed between the neck-support member 302 and the main body 301, and head-support faces 303A are formed with inner end faces of the neck-support member 302 at both end sides of the recess portion 303. The head-support face 303A can properly prevent the head of the passenger P from moving laterally when the vehicle rolls.

While, when the full-flat arrangement of the seat back 3 rotated forward is desired, the neck-support member 302 is rotated toward the main body 301, and thereby the back face 3B of the seat back 3 can be positioned horizontally.

Embodiment 5

Figure 13:
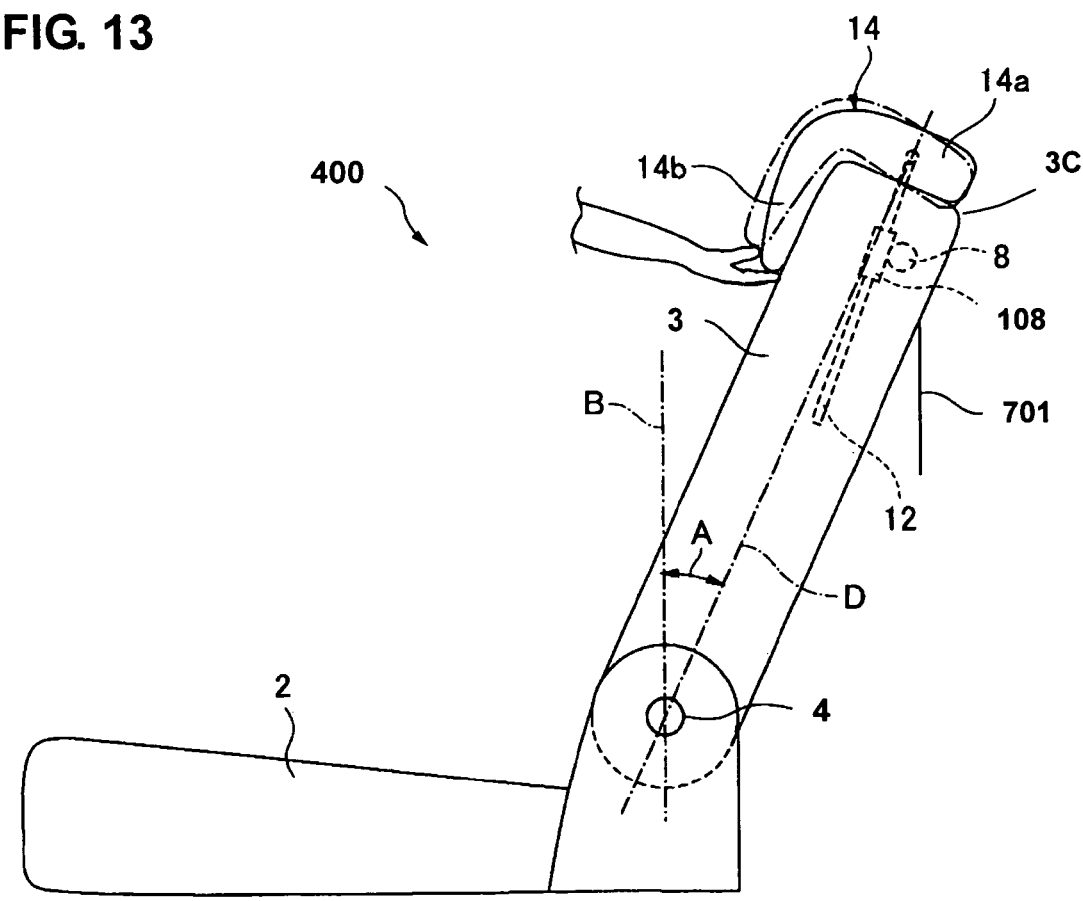
FIG. 13 is a side view of a seat for a vehicle of an embodiment 5 according to the present invention.
Figure 14:
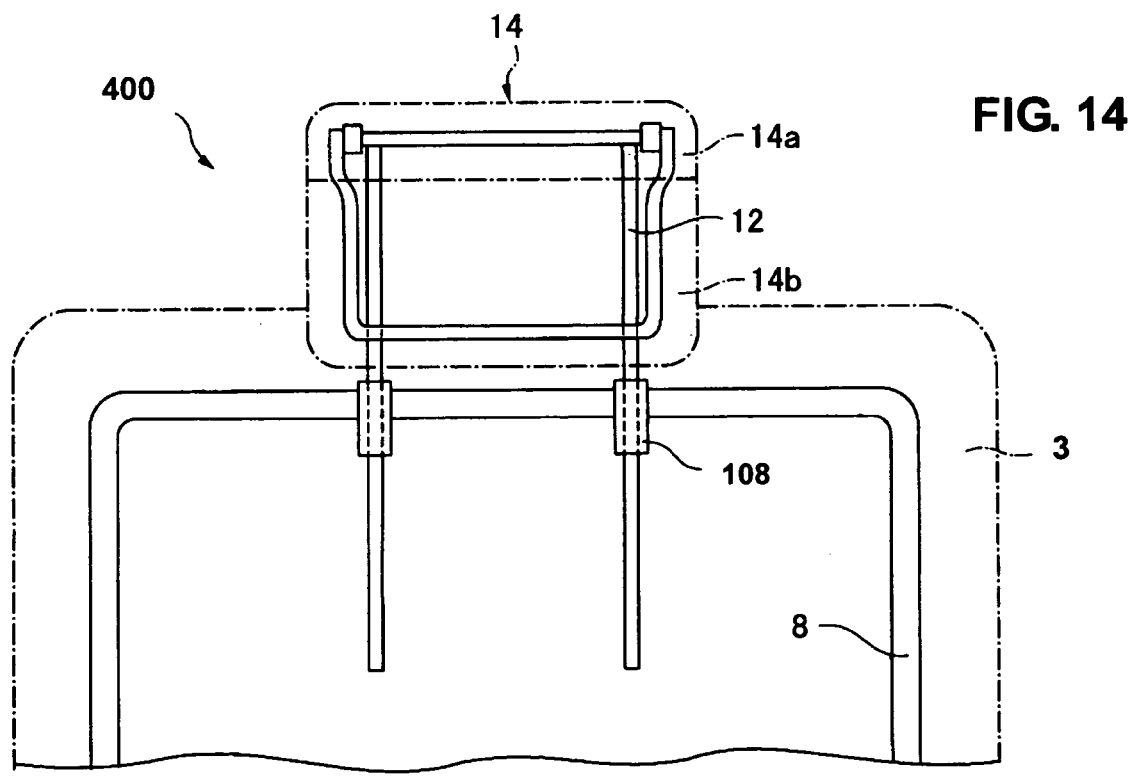
FIG. 14 is a partial elevation view of the seat shown in FIG. 13.
Figure 15:
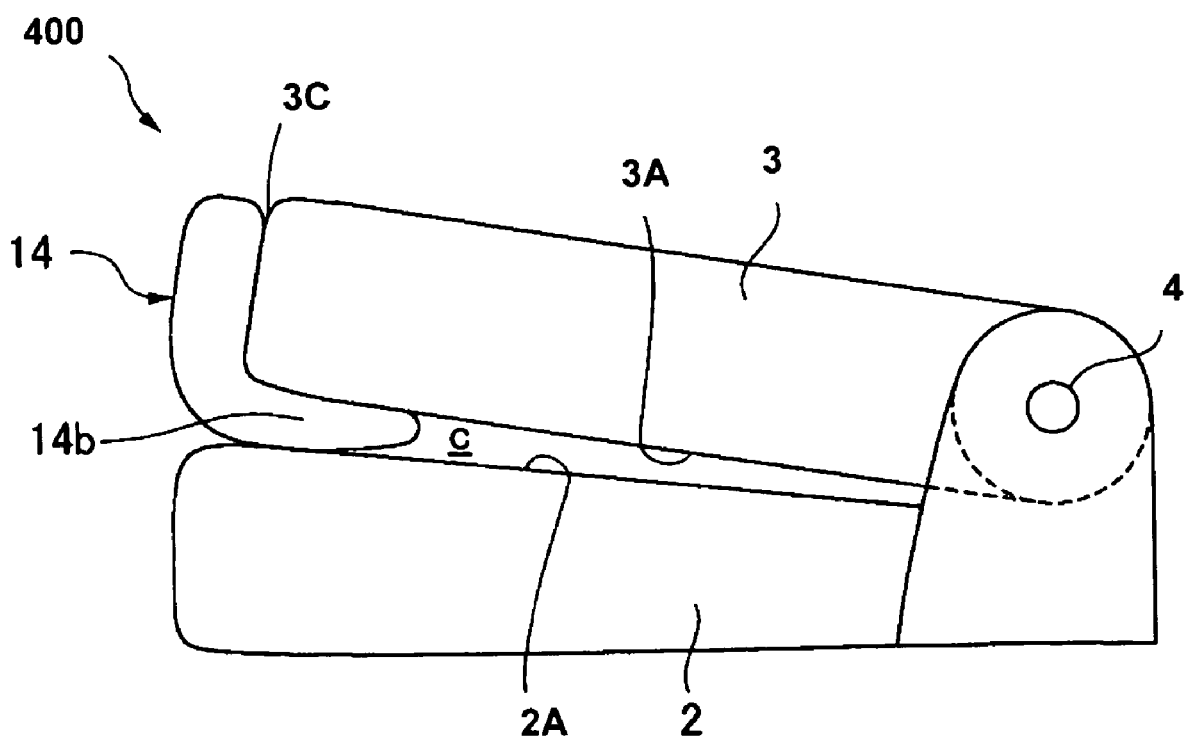
FIG. 15 is a side view of the seat shown in FIG. 13, in which the seat is in a full-flat state.
Figure 16:
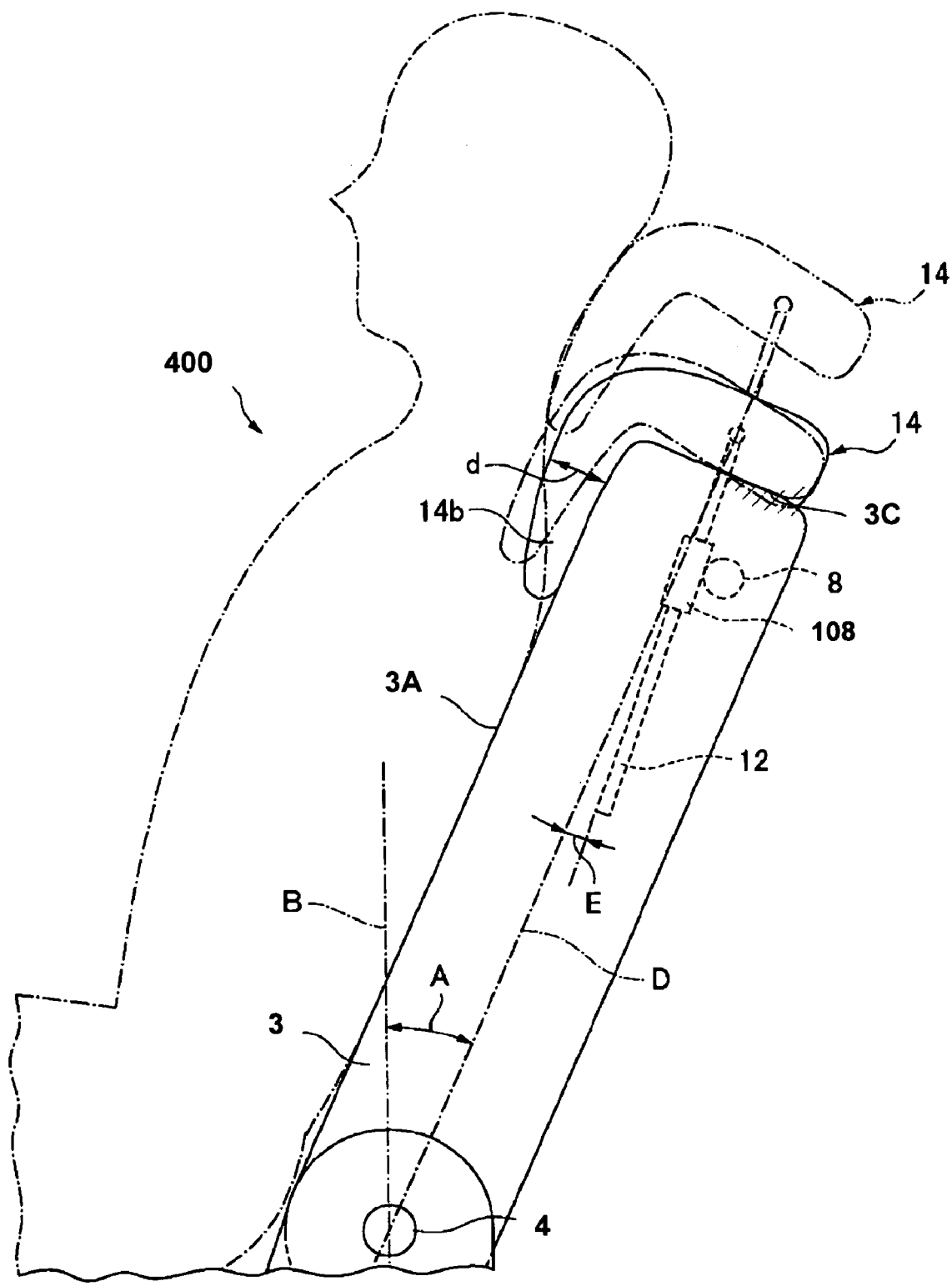
FIG. 16 is a partial enlarged side view of the seat for a vehicle of the embodiment 5.
Figure 17:
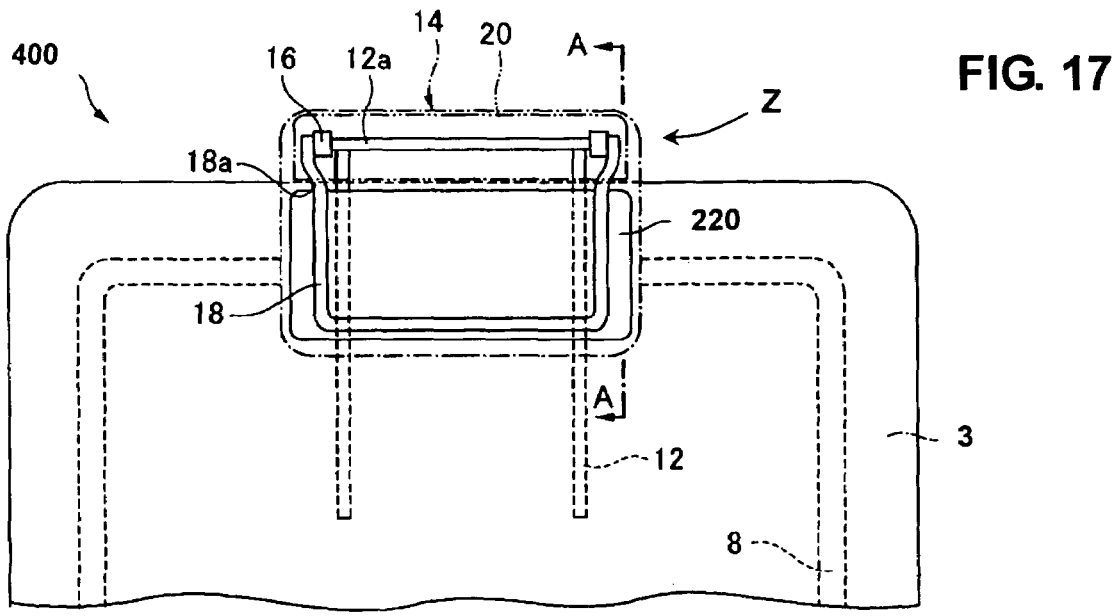
FIG. 17 is a partial elevation view of the seat for a vehicle of the embodiment 5.
Figure 18:
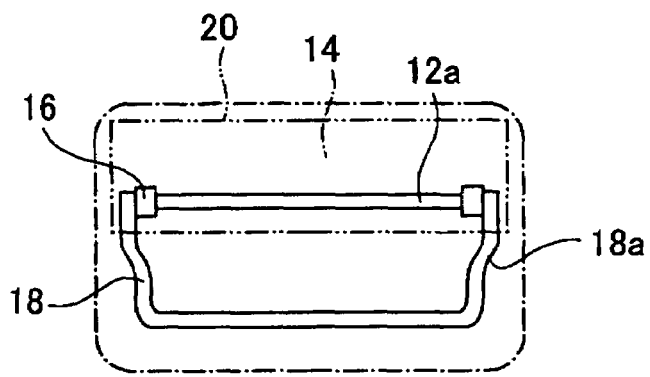
FIG. 18 is a plan view of a headrest shown in FIG. 17.
Figure 19:
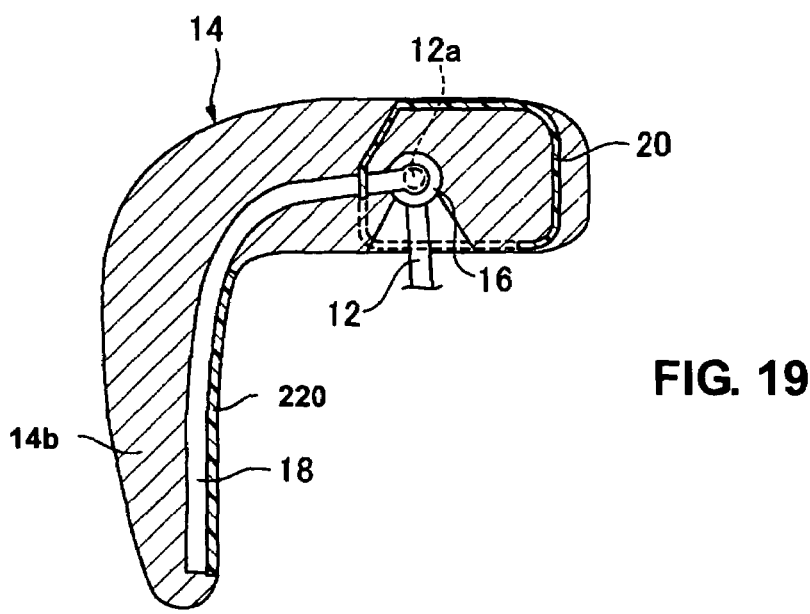
FIG. 19 is an enlarged sectional view of the headrest taken along line A-A of FIG. 17.
Figure 20:
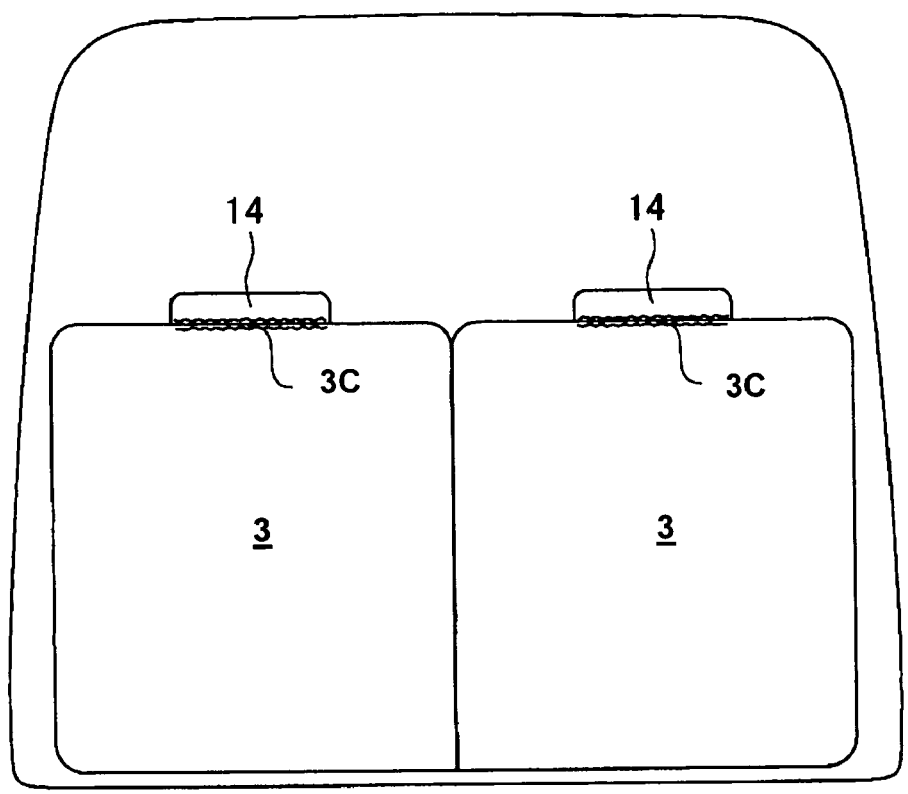
FIG. 20 is a back view of the seat for a vehicle of the embodiment 5.

An embodiment 5 of the seat for a vehicle will be described referring to FIGS. 13 through 20. FIG. 13 is a side view of a seat for a vehicle of an embodiment 5 according to the present invention. FIG. 14 is a partial elevation view of the seat shown in FIG. 13. FIG. 15 is a side view of the seat shown in FIG. 13, in which the seat is in a full-flat state. FIG. 16 is a partial enlarged side view of the seat for a vehicle of the embodiment 5. FIG. 17 is a partial elevation view of the seat for a vehicle of the embodiment 5. FIG. 18 is a plan view of a headrest shown in FIG. 17. FIG. 19 is an enlarged sectional view of the headrest taken along line A-A of FIG. 17. FIG. 20 is a back view of the seat for a vehicle of the embodiment 5.

Likewise, as shown in FIG. 13, a seat 400 of the embodiment 5 according to the present invention comprises the seat cushion 2 and the seat back 3 attached to the seat cushion 2. And, the seat back 3 is configured to be rotated forward and rearward via the hinge mechanism 4 provided at a lower portion. According to the present embodiment, at least forward-rotation may be necessary. Herein, an inclined angle A of the seat back 3 is adjustable to the standard position of an range of 10 to 20 degrees relative to a vertical line B by the hinge mechanism 4. In the present embodiment, substantially the same components as those of the previous embodiments described above are denoted by the same reference numerals.

An operation strap 701 is attached to the back face of the seat back 3, and an operation of this strap 701 from a baggage compartment or a rear seat behind the seat back 3 releases a lock of the set back by the hinge mechanism, so that the forward rotation can be allowed. Herein, the strap 701 is disposed in an area where the passenger behind the seat back 3 in an upright position can reach. This strap may be disposed, for example, at a vehicle side wall beside the seat back 3 Thus, the operation for the full-flat state of the seat may be facilitated along with an operation of the headrest that will be described below.

Also, inside the seat back 3 of the seat 400 is provided the reverse-U-shaped seat frame 8 as shown in FIG. 14. To an upper portion of the seat frame 8 is fixed a pair of guide sleeves 108. A pole member 12 that is of a reverse-U shape are inserted into the guide sleeves 108 so that it can slide vertically and be held in a certain vertical position with a slide resistance. To an upper end of the pole member 12 is fixed a saddle-shaped headrest 14. Thus, the headrest 14 is attached to the seat back 3 via the pole member 12 so as to be moved vertically. The headrest 14 comprises a main body 14a that is located at an upper portion and a neck-support portion 14b that is located at a front lower portion and supports and holds a rear head portion and the neck portion of the passenger.

As shown in FIG. 15, the seat 400 can be made in the full-flat state by rotating the seat back 3 forward Herein, a parallel-shaped or wedge-shaped space C is formed between the upper face 2A (passenger-support face) of the seat cushion 2 and the front face 3A (passenger-support face) of the seat back 3. The neck-support portion 14b of the headrest 14 is configured to be disposed in this space C.

A detailed structure of the seat 400 of the present embodiment will be described referring to FIG. 16. The headrest 14 is moved downward and located in its lowest position (shown by a broken line) when no passenger is seated and the headrest 14 is not used, so a properly-clear rear view or side view may be provided. When it is used, the headrest 14 is pulled upward by a manual operation from the lowest position to its use position. The pole member 12 is held in a desirable-height position by an engagement mechanism (not illustrated) that uses a slide resistance and is provided at the seat back 3. Herein, even if it is in the lowest position, the headrest 14 may be used properly by the small passenger.

Also, the neck-support potion 14b of the headrest 14 is configured such that when it is located in its lowest and rearmost position, its back face contacts an upper portion of the front face 3A of the seat back 3. Also, the lower-end portion of the neck-support portion 14b is configured such that a thickness d of a tip portion becomes gradually smaller. And, its tip end is of a round shape, so the passenger can hold (grip) it easily. The neck portion and its vicinity of the passenger is primarily supported by the lower end portion of the neck-support portion 14b, and the head portion of the passenger is primarily supported by the middle and upper portion of the neck-support portion 14b.

The pole member 12 to move the headrest 14 vertically are configured to be inclined relative to a center line D (or a portion extending in a vertical direction of the seat back frame) of the seat back 3 by an angle E of 2 to 10 degrees. Thus, the upward-pulling operation of the headrest 14 from the lowest position to the use position is facilitated by the above inclination of the pole member 12. Further, when the tall passenger is seated, its head portion can be supported in a more forward position, thereby improving the support.

Next, a detailed structure of the neck-support portion 14b of the headrest 14 will be described referring to FIGS. 17 through 19. FIG. 17 is a partial elevation view of the seat for a vehicle of the embodiment 5. FIG. 18 is a plan view of a headrest shown in FIG. 17. FIG. 19 is an enlarged sectional view of the headrest taken along line A-A of FIG. 17. Herein, the headrest 14 of the present embodiment is supported by a rotational support device Z in such a manner that the neck-support portion 14b of the headrest 14 is rotated around an rotational axis that extends substantially in the width direction of the seat back 3 and held at a specified angle relative to the seat back 3, which is basically the same structure as the previous embodiments. And, a specific structure constituting the rotational support device Z in the present embodiment will be apparent from the following descriptions.

To both ends of a base portion (horizontal axis, i.e., rotational axis) 12a of the reverse-U-shaped pole member 12 is attached the U-shaped headrest frame 18 via a friction mechanism 16 which will be described in detail below. The headrest frame 18 is disposed inside the headrest 14 and provides a necessary strength to the headrest 14. The headrest 14 is configured to be rotated longitudinally and held in a desirable rotational position via the headrest frame 18 in a state where a specified pressing force is applied by the friction mechanism 16.

Herein, as shown in FIGS. 17 and 18, the headrest frame 18 has two bent portions 18a. The bent portions 18a can absorb an impact load at a vehicle rear crash, thereby reducing a crash impact applied to the passenger properly.

A rear end portion of a main body 14a of the headrest 14 is covered by a reinforcing plate 20 that is a high rigidity member made of resin. In the case where a baggage compartment (not illustrated) is provided behind the seat 400, the headrest 14 can be easily pulled up or down between its lowest position and its use position by holding the reinforcing plate 20 with a hand of the passenger reaching out from the baggage compartment.

A rear face of the neck-support portion 14b of the headrest 14 is likewise covered by a reinforcing plate 220 that is a high rigidity member made of resin. The reinforcing plate 220 extends to the vicinity of the lower end portion of the neck-support portion 14b behind this portion 14b, so the passenger may easily hold (grip) the lower end portion of the neck-support portion 14b via the reinforcing plate 220. Thus, the puling up of the headrest 14 from the lowest position to the use position can be facilitated.

Further, the headrest 14 is configured, as described above, such that it (neck-support portion 14b) can be rotated forward from the lowest position (the rearmost stored position) by the passenger holding the lower end portion of the neck-support portion 14b against the pressing force applied by the friction mechanism 16. Accordingly, when the headrest 14 in the lowest position should be pulled up to the use position, at first the passenger operates to rotate the neck-support portion 14b forward in the lowest position by a proper rotational angle for the use position, and then the passenger just pulls the headrest 14 upward to the use position. Thus, the neck-support portion 14b can be rotated forward in the lowest position, a gap (space) can be formed between the neck-support portion 14b and the seat back 3. Therefore, it can be easier to hold the neck-support portion 14b in the lowest position. Also, since the use position of the neck-support portion 14b can be easily obtained just by pulling up the headrest 14, so it may be unnecessary to adjust the rotational angle when the headrest 14 has been pulled up to the use position.

Particularly, since the reinforcing plate 220 is provided at the rear face of the neck-support portion 14b in the present embodiment as described above, the passenger may easily hold the reinforcing plate 220 when the neck-support portion 14b is in the frontward-rotated position. Thereby, the pulling of the headrest 14 to the use position can be further facilitated.

The headrest frame 18 may be configured to extend to the vicinity of the lower end portion of the neck-support portion 14b near the rear face of the neck-support portion 14b, instead of the reinforcing plate 220 or along with the reinforcing plate 220, thereby increasing the thickness of a cushion material of the neck-support portion 14b to improve the support and facilitating the pulling of the headrest to the use position.

Further, as shown in FIG. 16, the top portion 3C of the seat back 3 that contacts the lower face of the main body 14a of the headrest 14 is made of flexible cushion material that is deformable, so that the headrest 14 (neck-support portion 14b) in the lowest position can be easily rotated forward. Instead, a gap (space) to allow the forward rotation may be provided between the lower face of the main body 14a of the headrest 14 and the top portion 3C of the seat back 3.

Also, the passenger may easily recognize that the headrest 14 is in the forward-rotated position when there exists wrinkles on the top portion 3C of the seat back 3 or the above gap is reduced, even if the passenger is located behind the seat 400 and does not see the neck-support portion 14b before the seat back 3. Accordingly, when the seat should be in the full-flat state, the passenger first holds the reinforcing plate 20 at the rear end portion of the main body 14a of the headrest 14 at the seat back in the upright use position from behind the seat, and then rotates the headrest 14 rearward until its rearmost position where it contacts the face 3A of the seat back 3.

Next, operations of the embodiment 5 of the present invention with the structure described above will be described. According to the present embodiment, the so-called saddle-shaped headrest 14 operative to be moved by the pole member 12 is used. Thus, when it is used, the headrest 14 is generally pulled up to the use position. While, when it is not used, the headrest 14 is generally lowered to the lowest position, thereby providing the properly-clear rear view. And, when the seat is used in the full-flat state by rotating the seat back 3 forward, the projection amount of the headrest 14 from the seat back 3 is made small by locating the headrest 14 in the lowest position. Thus, it may be unnecessary that the headrest 14 be removed from the seat back 3.

Further, according to the seat 400 of the present embodiment, the neck-support portion 14b of the headrest 14 can be rotated by the rotational support device Z around the base portion 12a (horizontal axis) of the pole member 12 when the headrest 14 is in the lowest position relative to the seat back 3. Thereby, first the passenger inserts the hand below the lower end portion of the neck-support portion 14b of the headrest 14 to rotate the neck-support portion 14b forward and holds the portion 14b surely, and then just pulls up the headrest 14 to the use position. As a consequence, according to the present embodiment, when the headrest 14 is in the lowest position relative to the seat back 3, the headrest 14 can be pulled up to the use position easily.

Also, when the headrest 14 is used by rotating the neck-support portion forward to the position to properly support the head or neck portion of the passenger, the neck-support portion 14b can be rotated to the proper position in advance of pulling up of the headrest 14 from the lowest position. Thereby, it may not necessary to rotate the headrest 14 after being pulled up.

The present embodiment is also applicable to a fixed type of vehicle seat in which the seat back 3 is fixed to the upright-use position (such as, a second seat of a sedan car).

According to the present embodiment, although the rear face of the neck-support portion 14*b* of the headrest 14 contacts the front face (passenger-support face) of the upper portion of the seat back 3 when the headrest 14 is in the lowest position, the neck-support portion 14*b* can be rotated forward around the horizontal axis from this position (rearmost stored position). Therefore, by rotating the neck-support portion 14*b* forward in the lowest position first, the headrest 14 can be pulled up the use position easily.

According to the present embodiment, since the thickness of the neck-support portion 14*b* of the headrest 14 becomes gradually thinner toward the lower end portion, the passenger can easily hold the lower end portion of the neck-support portion 14*b* when pulling up the headrest 14 from the lowest position to the use position. Thereby, the operation of rotating the neck-support portion 14*b* and puling up the headrest 14 can be easier. Also, since the thickness of the neck-support portion 14*b* of the headrest 14 in the longitudinal direction becomes smaller toward the lower end portion, the headrest 14 can be disposed within the gap (space) formed between the seat cushion 2 and the seat back 3 in the full-flat state of the seat. Thereby, the full-flat arrangement can be provided easily.

According to the present embodiment, since the headrest 14 in the use position is disposed to be inclined toward the vertical direction by the angle E relative to the standard position of the seat back 3 that has the rearward-inclined angle A, the head and/or neck portion of the passenger can be properly supported. Also, since the headrest 14 is pulled upward from the lowest position to the use position by the pole member 12 with the inclined angle E relative to the seat back 3, the pulling angle is close to the vertical direction. Thus, a smooth pulling operation can be obtained.

According to the present embodiment, the top portion 3C of the seat back 3 is configured to allow the forward rotation of the headrest by the passenger, namely there is provided the gap (space) between the lower face of the headrest 14 and the top portion 3C of the seat back or the top portion 3C of the seat back is made of the flexible material. Thus, the passenger can rotate the neck-support portion 14*b* of the headrest 14 easily in the lowest position of the headrest 14 and thereby pull up the headrest 14 to the use position.

Figure 21:
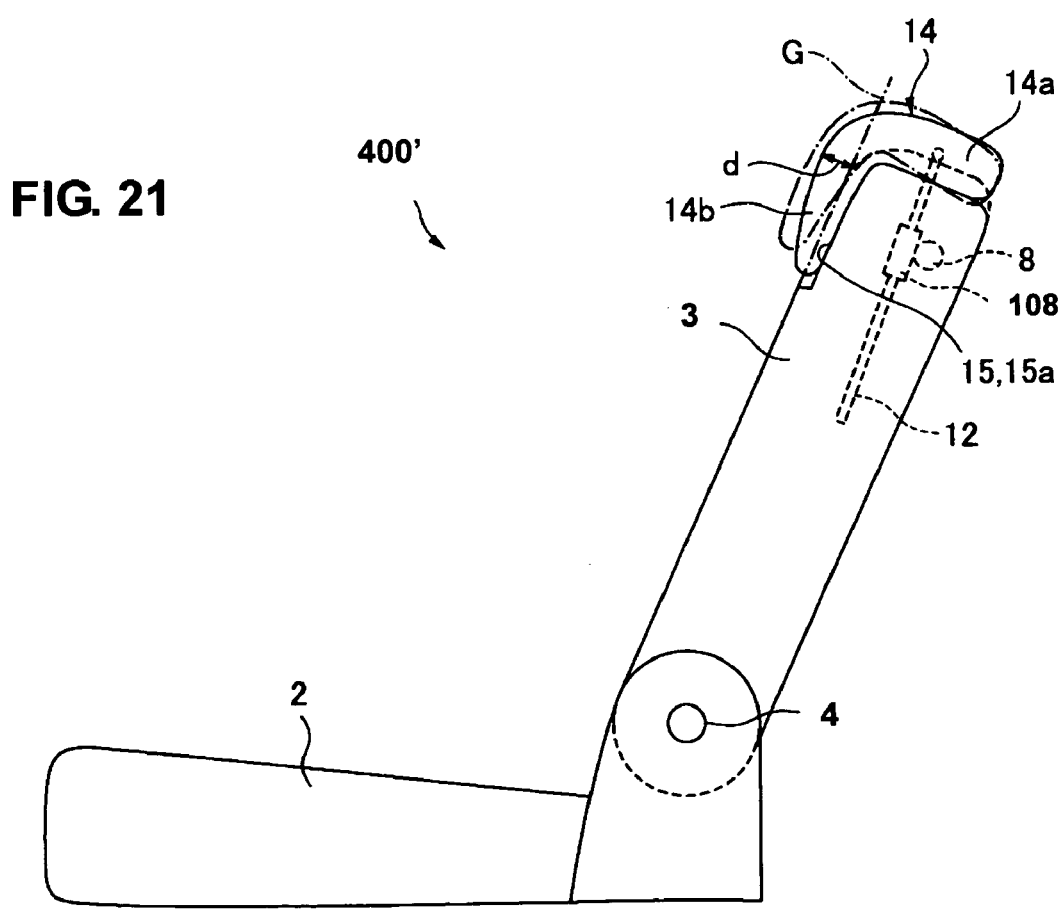
FIG. 21 is a side view of a modification of the embodiment 5.

Next, a modification of the seat of the embodiment 5 according to the present invention will be described referring to FIG. 21. FIG. 21 is a side view of this modification of the embodiment 5. Although the basic structure of this modification is the same as the embodiment 5, a recess portion 15 is formed at a central portion of the front face and the top portion of the seat back 3 in the modification. The headrest 14 of this seat 400' can be disposed within this recess portion 15 when it is in the lowest position.

The neck-support portion 14*b* of the headrest 14 can be provided in the lowest position in such a manner that its rear face contacts a bottom face 15*a* of the recess portion 15 of the seat back 3. Also, the neck-support portion 14*b* of the headrest 14 is configured such that a thickness d of its portion projecting forward from a line G extending the front face 3A of the seat back 3 becomes smaller toward the lower end portion. The lower end portion of the neck-support portion 14*b* is of a round shape so that the passenger can hold it easily. And, there exists a space (at least 10 mm or more) between the lower end portion of the neck-support portion 14*b* and a lower face of the recess portion 15, so that the passenger's hand can be inserted in the space.

According to the seat of the modification of the embodiment 5, since the recess portion 15 to receive the headrest 14 in the lowest position is formed at the central portion of the front face and the top portion of the seat back 3, the amount of the upward projection of the headrest 14 in the lowest position from the top end of the seat back made smaller due to the recess portion 15. Thus, the rear view can be improved.

Likewise, since the amount of the forward projection of the headrest 14 in the lowest position from the front face of the seat back made smaller due to the recess portion 15, the full-flat arrangement of the seat with the seat back 3 rotated forward can be attained easily. Further, since the recess portion 15 is formed behind the neck-support portion 14*b* of the headrest 14, the longitudinal thickness of the lower end portion of the neck-support portion can be made large. Thus, the support of the head or neck portion of the passenger can be further improved.

Embodiment 6

Figure 22:
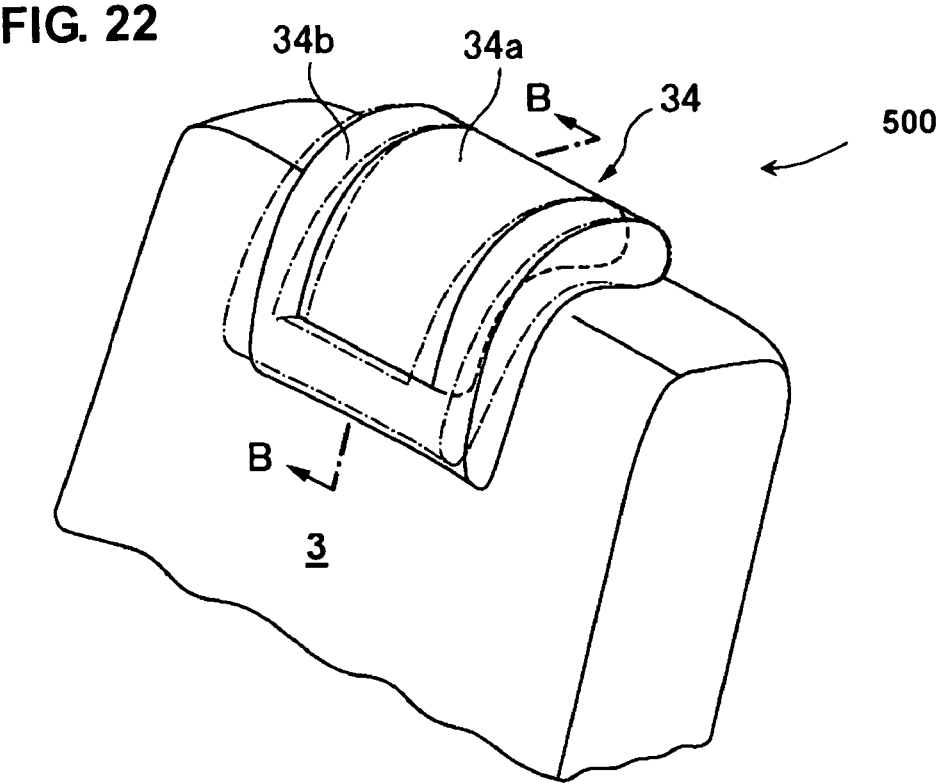
FIG. 22 is a partial perspective view of a seat for a vehicle of an embodiment 6 according to the present invention.
Figure 23:
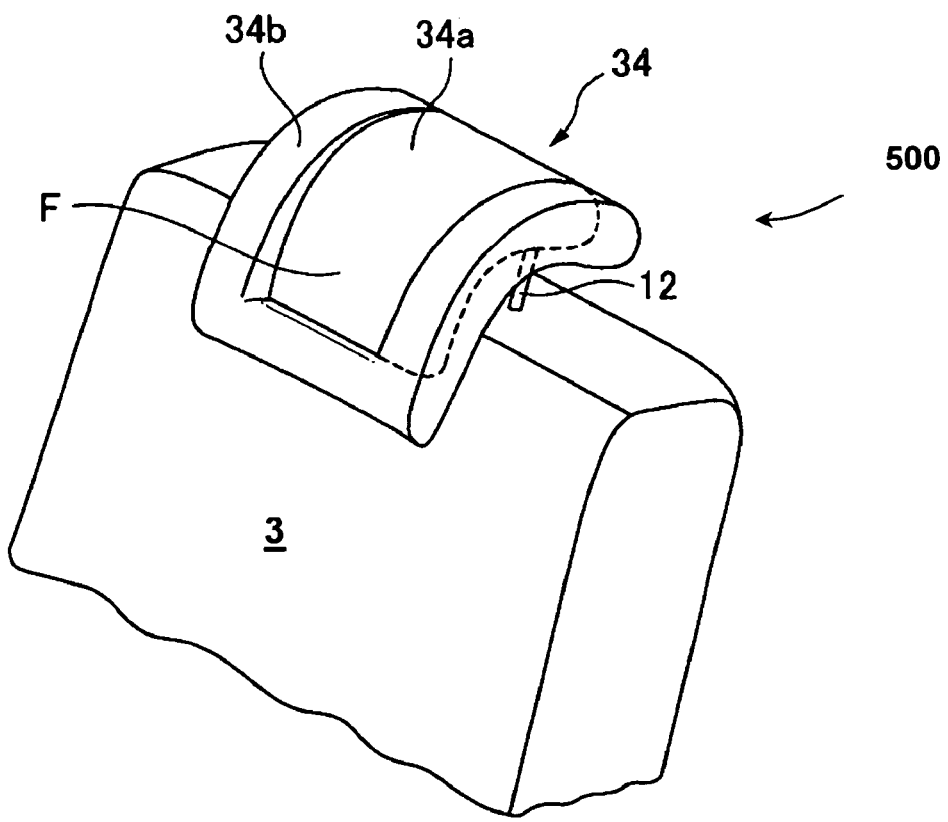
FIG. 23 is a partial perspective view of the seat shown in FIG. 22, in which the seat is in a use state.
Figure 24:
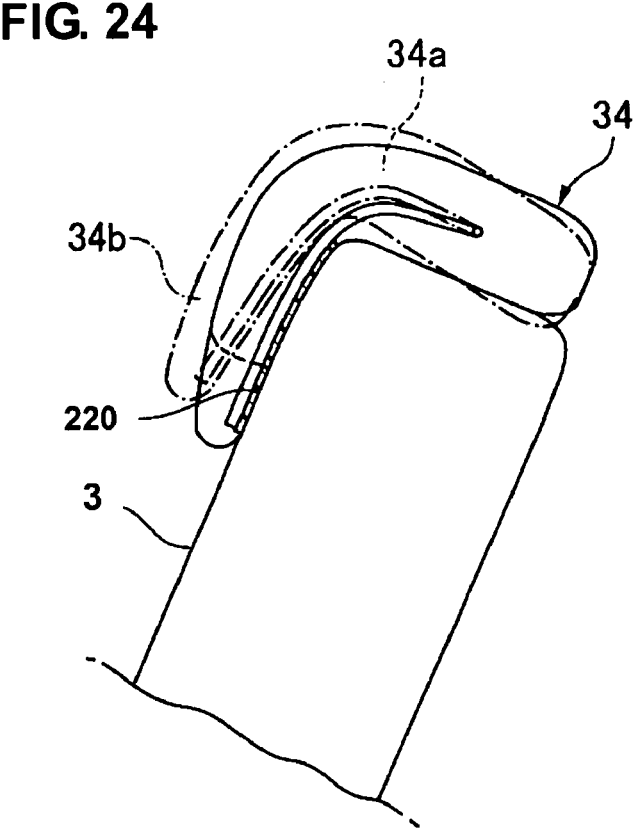
FIG. 24 is a partial sectional view taken along line B-B of FIG. 22.

An embodiment 6 of the seat for a vehicle will be described referring to FIGS. 22 through 24. FIG. 22 is a partial perspective view of a seat for a vehicle of the embodiment 6 according to the present invention. FIG. 23 is a partial perspective view of the seat shown in FIG. 22, in which the seat is in a use state. FIG. 24 is a partial sectional view taken along line B-B of FIG. 22. Descriptions of the same portions as the embodiment 5 are omitted here and different portions will be described.

In the embodiment 6, a headrest 34 of this seat 500 comprises a main body 34*a* and a neck-support portion 34*b* that are formed separately from each other, as shown in FIGS. 22 through 24. The main body 34*a* is part of the headrest 34 that is located at a front and central portion, in which the above-described base portion 12*a* of the pole member 12 is disposed. The main body 34*a* is movable with the pole member 12, but fixed in the longitudinal direction without rotating.

Meanwhile, the neck-support portion 34*b* is formed in a U shape so as to surround the main body 34*a* at its both-side portions and lower portion. The resin reinforcing member 220 (see FIG. 24) is attached to a rear face of the neck-support portion 34*b* like the embodiment 5. Likewise, the above-described headrest frame 18 (see FIG. 17) is disposed in the neck-support portion 34*b*, and is rotatable with the headrest frame 18.

Likewise, the headrest frame 18 of the present embodiment is attached to the base portion 12*a* of the pole member 12 via a friction mechanism 16, which will be described bellow, and thereby a specified pressing force is applied to the headrest frame 18 and the neck-support portion 34*b* can be held in a certain rotational position.

The main body 34*a* of the headrest 34 is fixed and only the neck-support portion 34*b* is rotatable in the embodiment 6. Therefore, when the headrest 34 is pulled up from its lowest position to its use position, the passenger first holds a lower end portion of the neck-support portion 34*b* of the headrest 34 and then rotates the neck-support portion 34*b* forward by a desirable angle against the pressing force. Subsequently, the passenger can just pull up the headrest 34 to the use position.

Further, according to the embodiment 6, as shown in FIG. 23, when the neck-support portion 34*b* is rotated forward by the desirable angle, a recess portion F is formed between the neck-support member 34*b* and the main body 34*a*. The rear head portion of the passenger is held stably by the recess portion F and the neck portion is held by the neck-support portion 34*b*. As a sequence, the whole head of the passenger can be supported effectively. Also, since there are provided two face portions at both sides, and thereby the head can be properly prevented from moving laterally.

Figure 25:
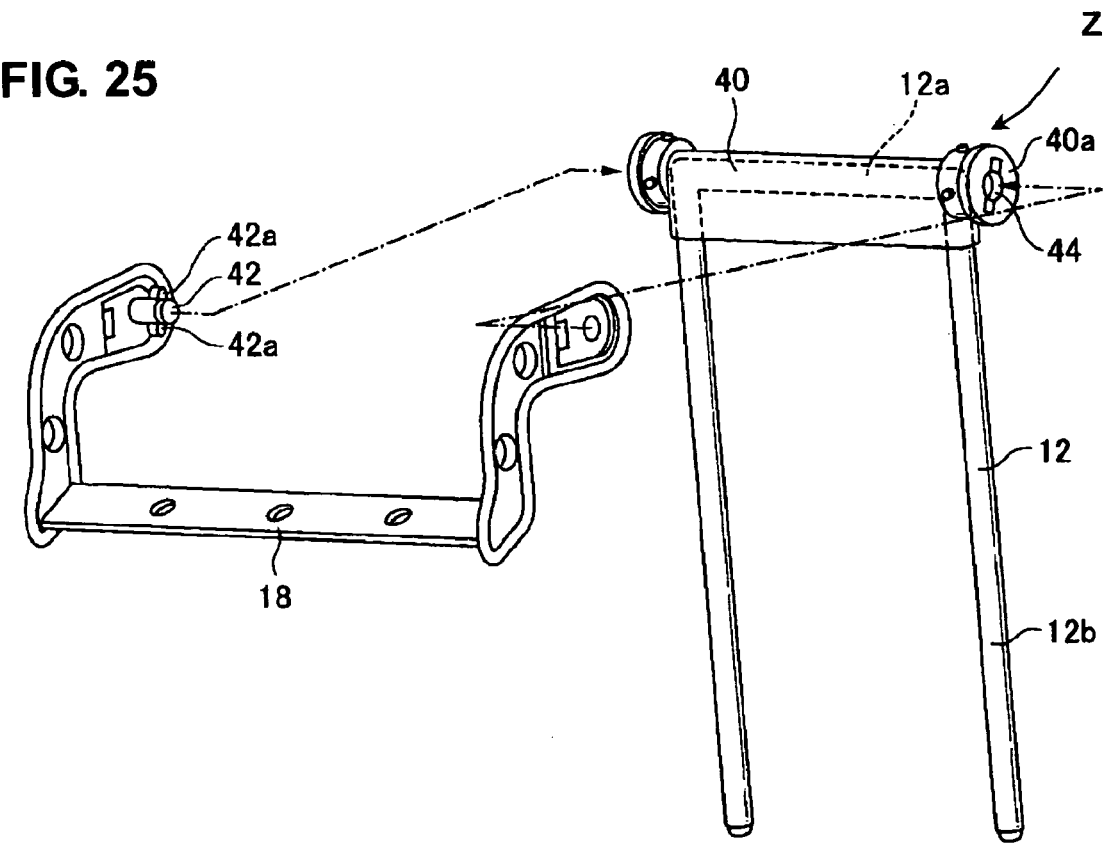
FIG. 25 is an exploded perspective view of an exemplified friction mechanism that is applicable to the embodiments 5 and 6.
Figure 26:
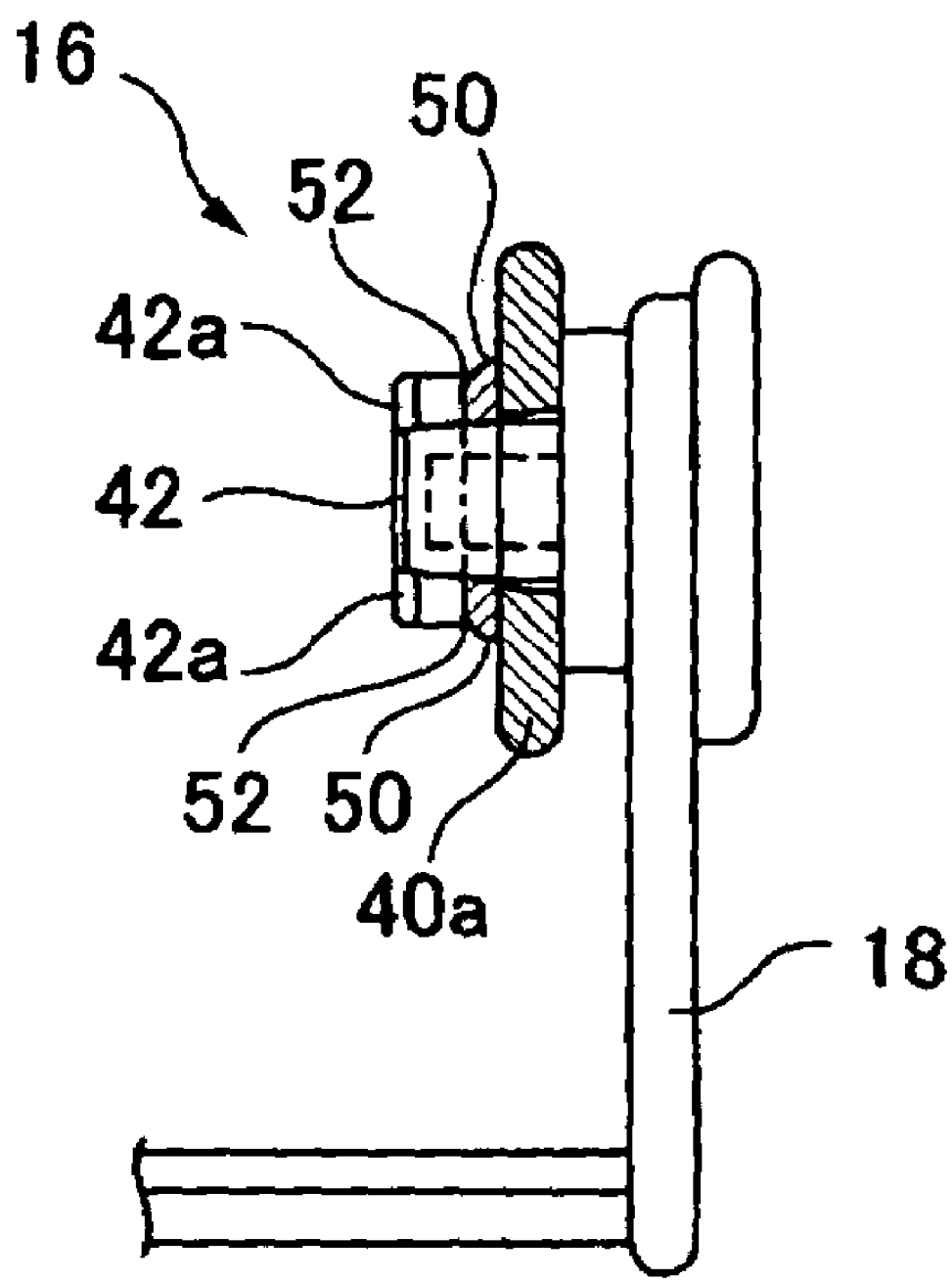
FIG. 26 is a partial elevation sectional view of the friction mechanism shown in FIG. 25.
Figure 27A:
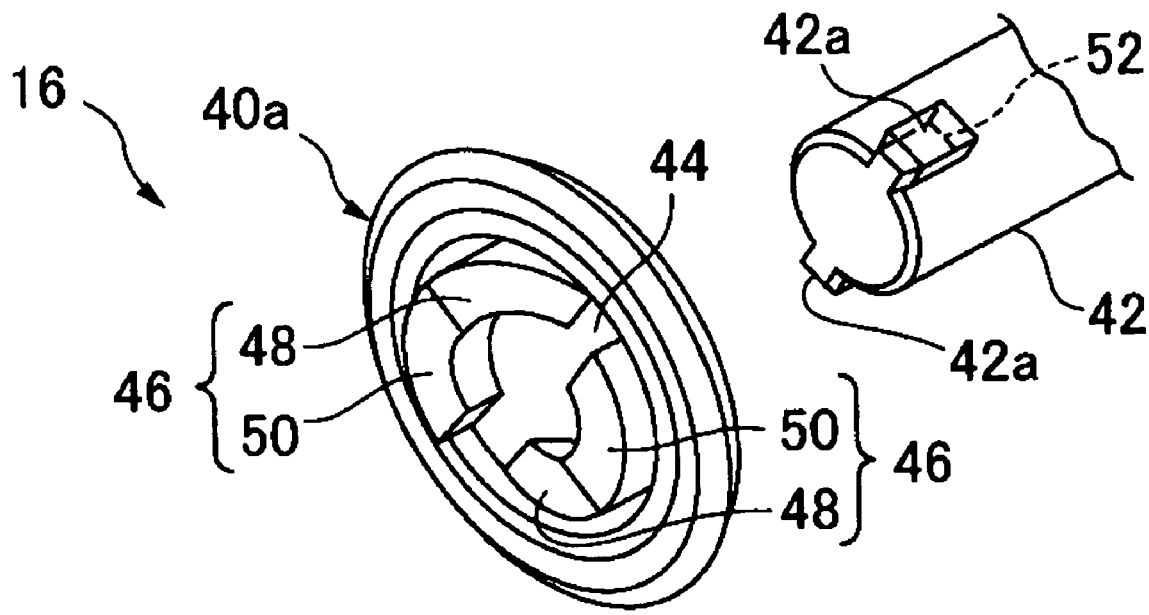
FIGS. 27A and 27B are respectively an exploded view and a side view of the friction mechanism shown in FIG. 25.
Figure 27B:
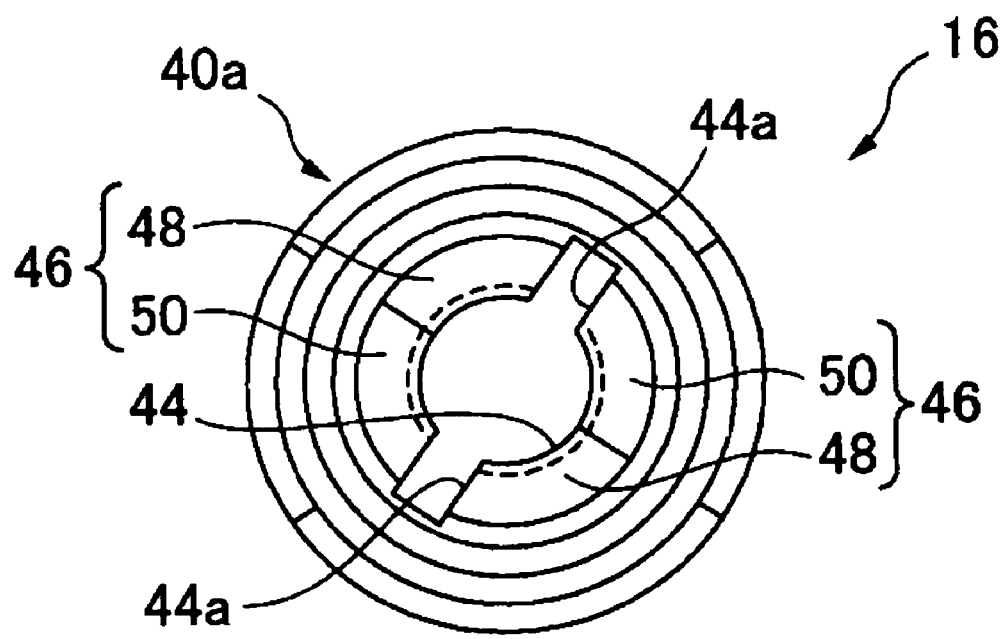

Next, an exemplified friction mechanism that is applicable to the above-described embodiments 5 and 6 will be described referring to FIGS. 25 through 27A, B. FIG. 25 is an exploded perspective view of the exemplified friction mechanism that is applicable to the embodiments 5 and 6. FIG. 26 is a partial elevation sectional view of the friction mechanism shown in FIG. 25. FIGS. 27A and 27B are respectively an exploded view and a side view of the friction mechanism shown in FIG. 25. Hereinafter, a case where the exemplified friction mechanism is applied to the embodiment 5 as a mechanism constituting part of a rotational support device Z will be described.

The pole member 12 is made of a bar-shaped member that is bent in a reveres-U shape, as shown in FIG. 25, which comprises the base portion 12a extending in the vehicle width direction and a pair of leg portions 12b extending downward from the both ends of the base portion 12a. The base portion 12a is disposed within the headrest 14 so as to be covered by a cylindrical base portion holder 40. The leg portions 12b are provided at the seat back 3 so as to move vertically as described above.

At both ends of the holder 40 are provided pivot members 40a that pivotally support pivotal axes (lateral axes) 42 of the U-shaped headrest frame 18, which will be described below. Also, at upper end portions of the headrest frame 18 are provided pivotal axes 42 that project toward each other.

The pivotal axes 42 are inserted into engagement holes 44 formed at the pivot members 40a, and thereby the pivotal axes 42 are pivotally supported. Thus, the headrest 14 (headrest frame 18) are configured to rotate around the pivotal axes 42.

The friction mechanism 16 is a mechanism for providing a rotational position holding force to the headrest frame 18 (headrest 14) with a frictional force (pressing force) by the engagement of the pivotal axes 42 and the pivot members 40a, which will be described below.

As shown in FIGS. 26 and 27A, a pair of engagement projections 42a is provided at a tip of each of the pivotal axes 42 so as to extend in a radial direction respectively with an angle difference of 180 degrees. Meanwhile, at each pivot member 40a is provided an engagement hole 44 and a pair of notch portions 44a. The pivotal axis 42 is inserted into and engaged with the hole 44, and the projection 42a is inserted into and engaged with the notch portion 44a.

The engagement projections 42a are configured to be inserted into the notch portions 44a of the pivot member 40a in a specified position where the headrest 14 (headrest frame 18) is rotated forward from its rearmost position (a state where the headrest 14 contacts the front face of the seat back 3) by an angle of 90 degrees or more (for example, 150 degrees).

Boss portions 46 projecting toward the inside of the headrest 14 are provided at an peripheral edge of the engagement hole 44 except a portion where the notch portions 44a are formed. The height of the boss portions 46 (a projection height in a perpendicular direction to the paper face of FIG. 27B) is configured to be changeable according to a location of its center angle of the hole 44. Specifically, in FIG. 27B, the boss height becomes gradually higher as the counterclockwise center angle from the position of the notch portion 44a increases (accordingly, a boss end face is a slant face 48). And, this boss height does not change after the certain point (at the counterclockwise center angle of approximately 90 degrees) despite the increase of the center angle (accordingly, the boss end face is a flat face 50).

The pivotal axis 42 is configured such that slide faces 52 of outside faces of the engagement projections 42a contact the flat faces 50 of the boss portion 46 when engaging with the pivot member 40a. Herein, by properly setting the boss height of the flat faces 50, the engagement projections 42a (or the pivotal axis 42) or the boss portion 46 could be slightly deformed, and the specified pressing force could be generated between the slide faces 52 and the flat faces 50 by a restoring force of this deformation. Thus, the pressing force could be the frictional force against the rotation of the headrest 14.

Accordingly, when the force to rotate the headrest 14 (headrest frame 18) acts, in the case where a rotational moment around the pivotal axis 40 is relatively small (small pressing force), the headrest 14 is not rotated due to the frictional force and remains at that position. While, in the case where the rotational moment is relatively large, the headrest 14 is rotated against the frictional force. In the embodiments 5 and 6, the specified pressing force is set to be 30 to 150 N.

Accordingly, when the passenger applies a pressing force that is greater than the above specified pressing force in order to rotate the headrest 14, the headrest 14 is allowed to be rotated slowly by the friction mechanism 16. And, when the applying of the pressing force is stop, the headrest 14 is held in that position (rotational angle) by the friction mechanism 16.

Meanwhile, when the headrest 14 is held in a certain position away from the seat back 3 after having being rotated forward, if a large impact force (greater than the above specified pressing force) acts on the headrest 14 rearward, the headrest 14 is allowed to rotate rearward with a certain period of time. Namely, the above impact force can be absorbed to some degree.

Herein, as described above, the pressing force generated by the frictional force of the friction mechanism 16 is set to be within the range of 30 to 150 N. The force is more preferably set to be 40 to 100 N. Thus, since the pressing force is set to be 30 N or greater (more preferably, 40N or greater), the headrest 14 can be used stably by being held in the desirable position. While, since the pressing force is set to be 150 N or less (more preferably, 100N or less), the headrest 14 can be rotated forward properly by the passenger with the hand from before or behind the seat. Also, in the case where the large impact force acts on the passenger seated on the seat, the headrest 14 is allowed to rotate rearward against the pressing force (frictional force). Thus, the impact force is absorbed and thereby the head of the passenger can be protected properly.

Figure 28:
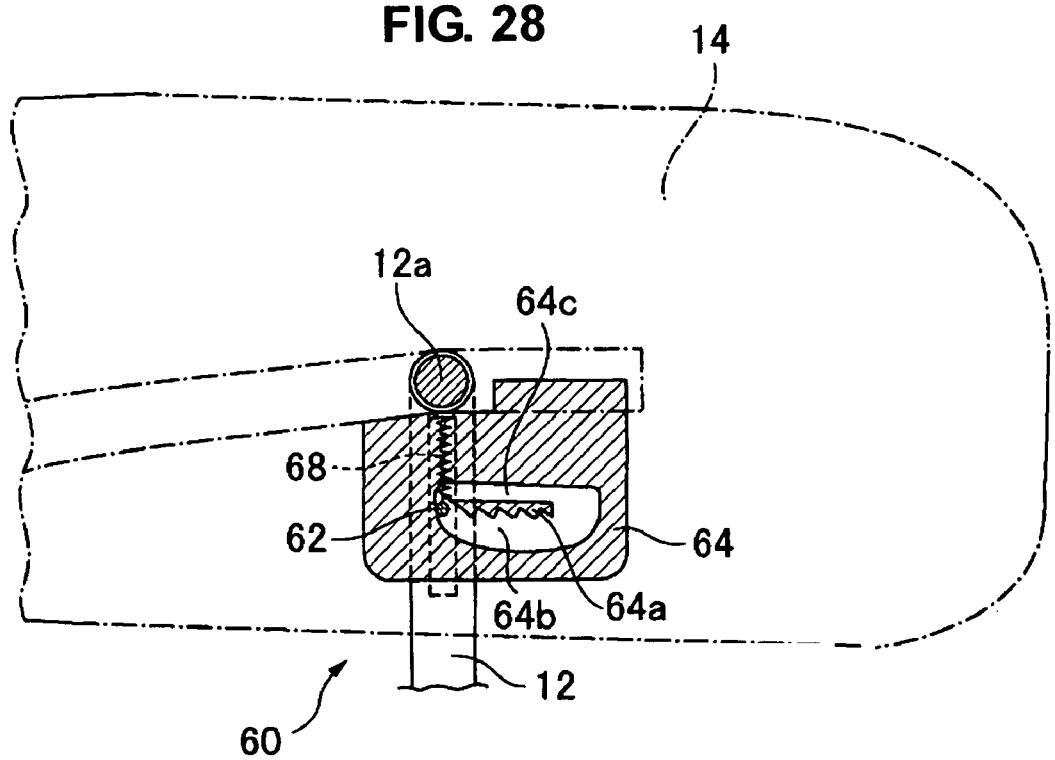
FIG. 28 is a partial side view of another exemplified friction mechanism that is applicable to the embodiments 5 and 6.
Figure 29:
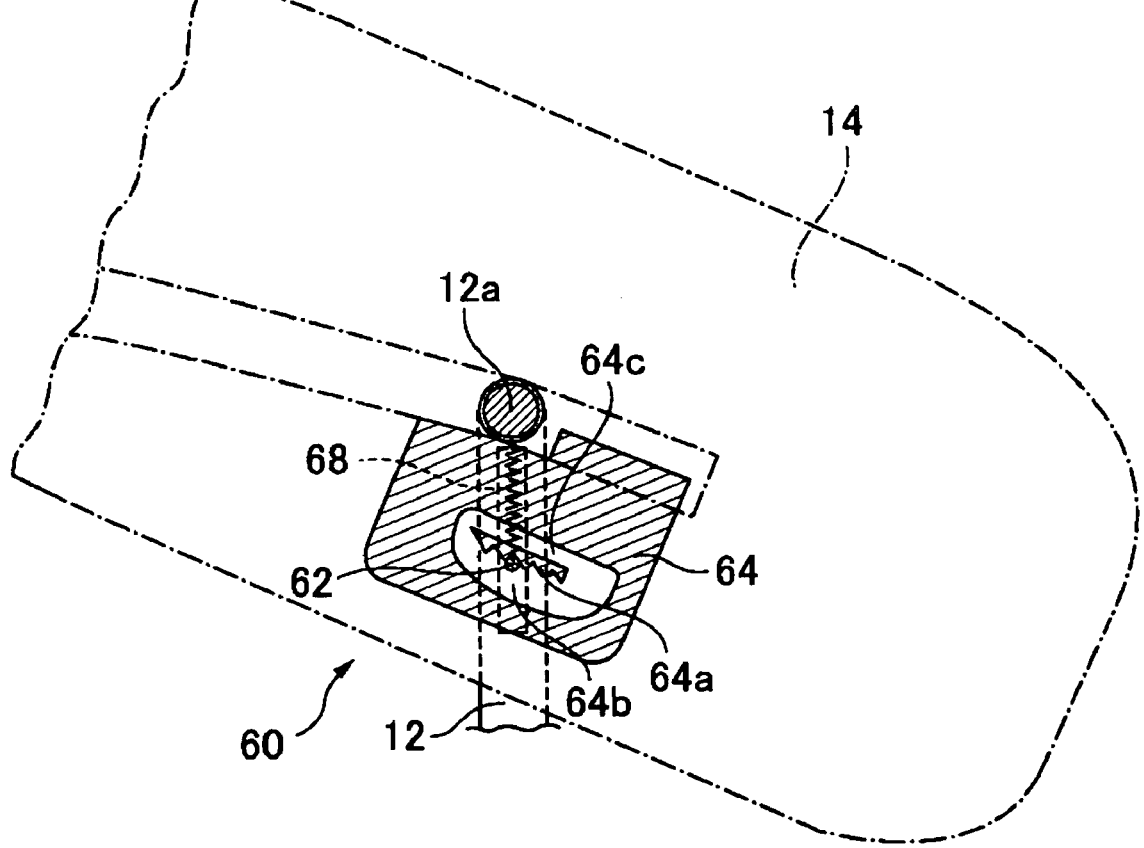
FIG. 29 is a partial side view of the friction mechanism shown in FIG. 28, in which the friction mechanism is in a certain rotational position.
Figure 30:
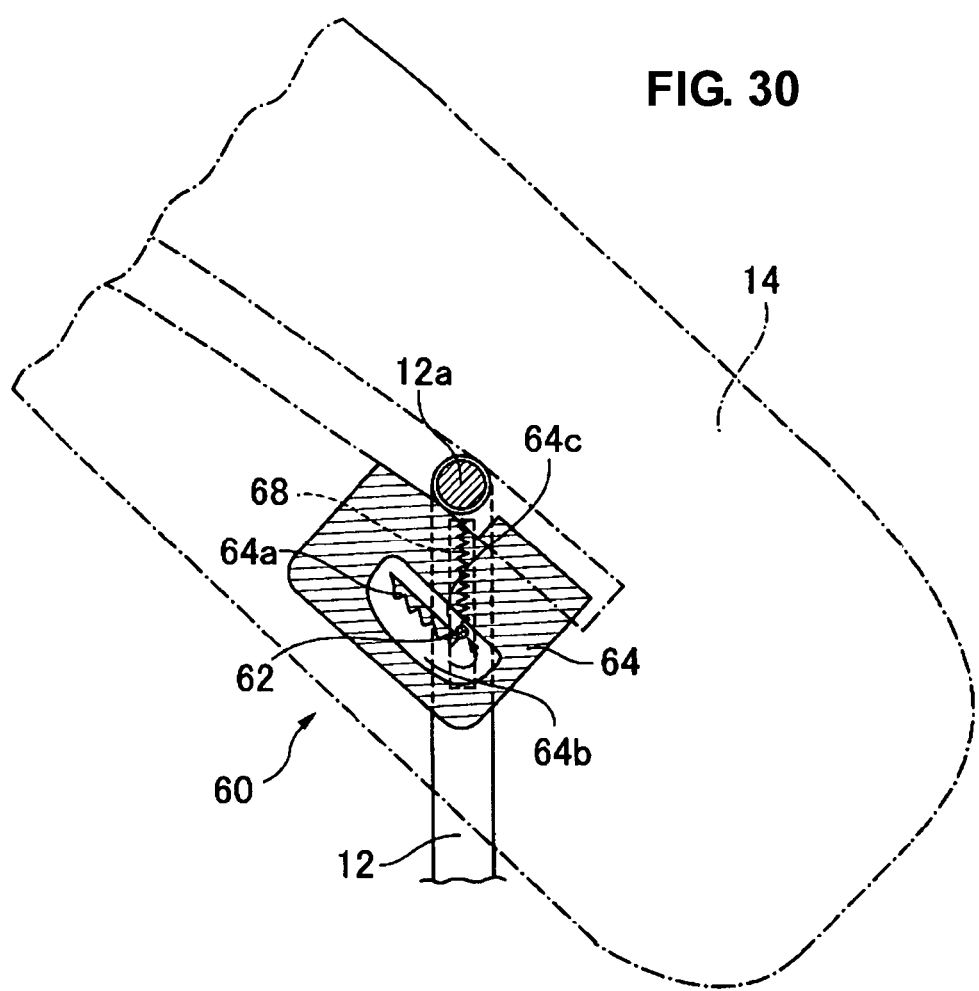
FIG. 30 is a partial side view of the friction mechanism shown in FIG. 28, in which the friction mechanism is in a foremost rotational position.
Figure 31:
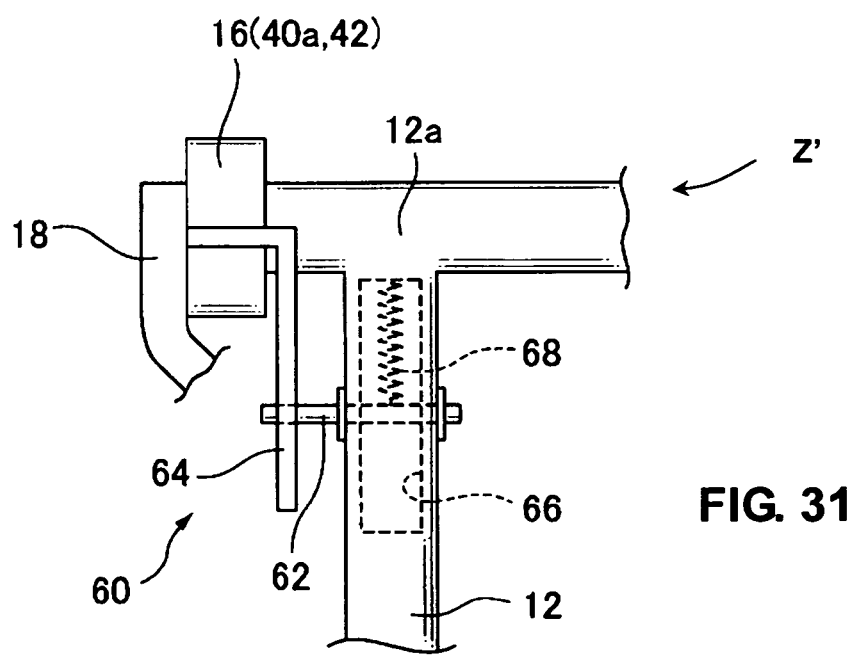
FIG. 31 is a back view of the friction mechanism shown in FIG. 28.

Next, another exemplified friction mechanism that is applicable to the above-described embodiment 5 and 6 will be described referring to FIGS. 28 through 31. FIG. 28 is a partial side view of another exemplified friction mechanism that is applicable to the embodiments 5 and 6. FIG. 29 is a partial side view of the friction mechanism shown in FIG. 28, in which the friction mechanism is in a certain rotational position. FIG. 30 is a partial side view of the friction mechanism shown in FIG. 28, in which the friction mechanism is in a foremost rotational position. FIG. 31 is a back view of the friction mechanism shown in FIG. 28. Hereinafter, this exemplified friction mechanism that is applied to the embodiment 5 as a mechanism constituting part of another rotational support device Z' will be described.

In the present friction mechanism, a ratchet mechanism is newly added to the basic structure of the above-described friction mechanism. Namely, the friction mechanism 16 comprising the pivot member 40a and the pivotal axis 42 that are shown in FIG. 31 is used in the present friction mechanism as well, but a ratchet mechanism 60 is newly added.

As shown in FIGS. 28 through 31, the ratchet mechanism 60 comprises an engagement bar 62 that is attached to the pole member 12 and a guide bracket 64 that guides the bar 62 and is fixed to the pivotal axis 42 of the friction mechanism 16. Specifically, the engagement bar 62 is attached to a housing 64 provided in the pole member 12 so as to be biased by a spring 68 and movable in a longitudinal direction of the pole member 12 in the housing 66. A biasing force generated by the spring 68 is zero when the bar 62 is located in a position shown in FIG. 28. And, the spring force is generated to be directed downward when the bar 62 is located above this position, while it is generated to be upward when the bar 62 is located below this position.

Since it is fixed to the pivotal axis 42 of the friction mechanism 16, the guide bracket 64 is rotated along with the headrest frame 18. As shown in FIG. 28, the guide bracket 64 includes a sawlike pawl portion 64a, a guide hole 64b that is formed below the pawl portion 64a, and a bar-escorting portion 64c that is formed above the pawl portion 64a. Herein, the guide hole 64b and the bar-escorting portion 64c are formed continuously to form a circular path, and the pawl portion 64a is supported by another part of the guide bracket 64 via a support member, not illustrated.

When the headrest 14 is in a rearmost position without rotation, as shown in FIG. 28, in the present friction mechanism, the bar 62 is in a state where it is not biased by the spring 68. Then, when the headrest 14 is rotated forward to a certain position, as shown in FIG. 29, the guide bracket 64 is rotated with the headrest 14 and thereby the bar 62 is moved in the guide hole 64b and biased upward by the spring 68. Thus, the bar 62 is engaged with the pawl portion 64a, so that its forward movement is prevented and only its rearward movement is allowed. Thereby, the forward movement of the headrest 14 is allowed, while the rearward movement of the headrest 14 is prevented.

Further, when the headrest 14 needs to be returned to the rearmost position, the passenger may rotate the headrest 14 to a foremost rotational position, as shown in FIG. 30, where the lever 12 is disengaged with the pawl portion 64a. At this point, the passenger may rotate the headrest 14 to the rearmost position manually. Thereby, the bar 62 is pushed by the upward biasing force of the spring 68 and returned to the position shown in FIG. 28 by way of the bar-escorting portion 64c.

Herein, likewise, the pressing force generated by the frictional force 16 of the present friction mechanism 16 is set to be within the range of 30 to 150 N. Also, likewise, the force may be more preferably set to be 40 to 100 N. The pressing force of the present friction mechanism with the ratchet mechanism shows a pressing force when the headrest 14 is rotated forward from the certain position with the bar 62 going beyond the pawl portion 64a, and a pressing force when the headrest 14 is moved from the foremost position to the rearmost position with the bar 62 getting through the bar-escorting portion 64c.

Further, the ratchet mechanism 60 is additionally used and thereby the rearward movement (rotation) of the headrest 14 is prevented even when the headrest 14 is fixed to the certain position. Therefore, the pressing force may be set to be 70 N or less so that the passenger can operate easily. Herein, the positioning of the forward rotation of the headrest 14 may be executed with only the ratchet mechanism, without the friction mechanism.

As described above, when the fixation of the seat back 3 by the hinge mechanism 4 is released with the operation of the operation strap 701 from behind the seat back 3 and the seat back 3 is rotated forward to be in the full-flat state, by setting the pressing force of the friction mechanism 16 to be 30 to 150 N, the neck-support portion 14b of the headrest 14 can be easily moved to the rearmost position in the lowest position. As a result, problems, in that the neck-support portion 14b that has not returned to the rearmost position may interfere with the upper face (sitting face) of the seat cushion 2 and the back face of the seat back 3 may not be made in the full-flat state, can be avoided.

Also, since the reinforcing plate 20 is provided at the rear end of the headrest 14 behind the horizontal axis, i.e., the rotational axis of the headrest 14, the neck-support portion 14b of the headrest 14 can be easily operated from the rear so as to be returned from the front position to the rearmost position. Also, by setting the pressing force of the friction mechanism for rotating the headrest 14 to be 100 N or less, preferably 70 N or less, the movement of the neck-support portion 14b to the rearmost position can be facilitated with the holding the reinforcing plate 20 or with the rearward pressing of the lower part of the neck-support portion 14b.

Also, the pressing force of the headrest 14 can be made small (40 N or less) by the rotational mechanism of the headrest 14 only equipped with the ratchet mechanism, so the full-flat arrangement can be facilitated. Specifically, the passenger may just rotate the headrest 14 to the foremost position or the slightly rearward position with the small operational force and then moves the seat back 3 forward by the operation of the strap 701. Thus, according to the headrest 14 contacting the seat cushion 2 with the forward movement of the seat back 3, the headrest 14 is rotated to the rearmost position. Herein, it is preferable that the rotational angle of the headrest 14 in the foremost position be set to be 70 degrees or less in the case where the rotational angle of the headrest 14 in the rearmost position is zero degree. Accordingly, the operation of the full-flat arrangement from behind the seat can be further facilitated. Also, provision of a coil spring to bias the seat back forward may further improve the utility.

Next, a method of measuring the pressing force of the friction mechanism will be described referring to FIG. 32. Although the pressing force is, for example, set to be in the rage of 30 to 150 N in the friction mechanism as described above, this pressing force is set by being measured in the following way. At first, the headrest 14 is repeatedly moved (rotated) about ten times at a speed in a range of 0.05 to 0.1 m/s between the rearmost position and the foremost position.

Figure 32:
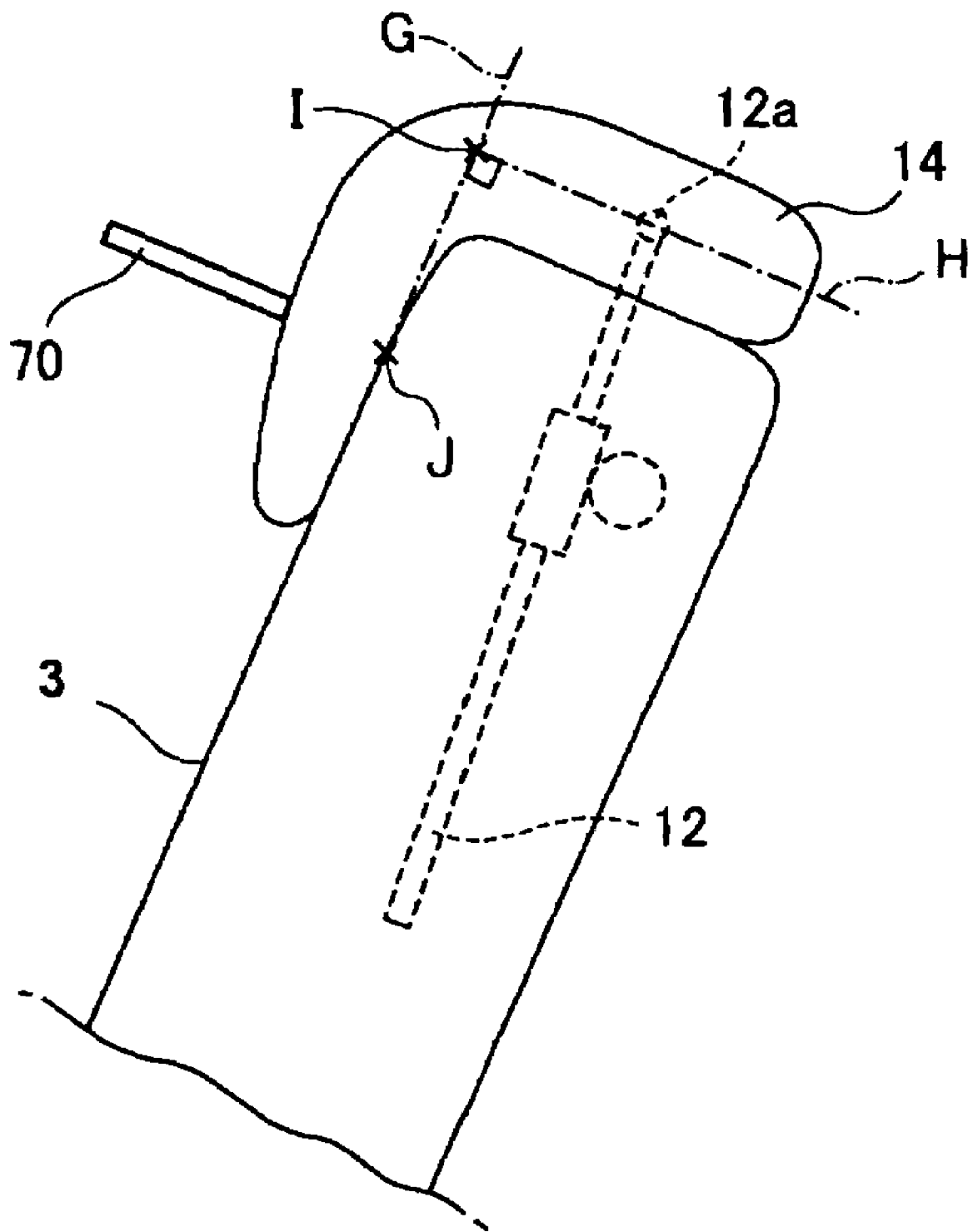
FIG. 32 is a schematic diagram showing a method of measuring a pressing force of the friction mechanism.

Then, as shown in FIG. 32, a measuring instrument (spring measuring instrument) 70 is attached to the surface of the headrest 14 at a position that corresponds to a point J that is located 100 mm below an intersection I of a line G that extends along the front face of the seat back 3 and a line H that extends from the base portion 12a of the pole member 12 in a direction perpendicular to the line G.

Next, the headrest 14 with the measuring instrument 70 is moved (rotated) at the speed in the range of 0.05 to 0.1 m/s between the rearmost position and the foremost position, and the maximum value (N) is measured at this time. This movement (rotation) is repeated three times and an average of the maximum value (N) is calculated. The value of the pressing force is adjusted so that this average can be within the range of 30 to 150 N.

The present invention should not be limited to the above-described embodiments, and any other modifications and improvements may be applied within the scope of a sprit of the present invention.

Although the above-described seats 1, 100, 200, 300, 400, 400' and 500 are the type of seat in which the seat back 3 can be rotated forward relative to the seat cushion 2, the seat of the present invention is applicable to another type of seat in which the seat cushion 2 can be rotated upward toward the seat back 3.

What is claimed is:

1. A seat for a vehicle, comprising:
a seat cushion having a passenger-support face;
a seat back having a passenger-support face, the seat back being pivotally attached to the seat cushion via a hinge mechanism;
a headrest including a main body to support a head portion of a passenger, and a neck-support portion to support a neck portion of the passenger, wherein the neck-support portion being formed separately from the main body;
a headrest pole member to support the headrest, the headrest pole member being provided at the seat back so as to move a position of the headrest between a lowest position and an upward-pulled position, wherein when the headrest is in the lowest position, a lower end portion of the main body of the headrest is located below a top portion of the seat back in an upright-use position; and
a rotational support device provided between the main body of the headrest and the neck-support portion of the headrest, the rotational support device being operative to support the neck-support portion of the headrest in such a manner that the neck-support portion of the headrest is rotated around a rotational axis that extends in substantially a width direction of the seat back and held at a specified angle relative to the main body of the headrest, wherein the neck-support portion of the headrest is substantially U shape so as to surround the main body of the headrest in such a manner when the neck-support portion of the headrest is rotated forward relative to the main body of the headrest by the rotational support device, and wherein a recess portion is formed between the neck-support member and the main body of the headrest.

2. The seat for a vehicle of claim 1, wherein the seat is configured such that the seat back can be rotated forward and folded on the seat cushion in such a manner that the passenger-support faces of the scat back and the seat cushion are substantially in parallel to each other.

3. The seat for a vehicle of claim 2, wherein the neck-support portion of the headrest is configured to have a relatively-thick lower portion and a relatively-thin upper portion.

4. The seat for a vehicle of claim 2, wherein a gap which is formed between the passenger-support faces of the seat back and the seat cushion at a portion that is near the hinge mechanism when the seat back is rotated forward and folded on the seat cushion, is larger than a gap which is formed between the passenger-support faces of the seat back and the seat cushion at another portion that is away from the hinge mechanism when the seat back is rotated forward and folded on the seat cushion.

5. The seat for a vehicle of claim 2, wherein the passenger-support face of the seat back is configured to have a recess in such a manner that a central portion thereof is recessed compared to both-side portion thereof and at least part of the neck-support portion of the headrest that is in the lowest position is located in the recess of the passenger-support face of the seat back when the seat back is rotated forward and folded on the seat cushion.

6. The seat for a vehicle of claim 1, wherein the seat is configured such that the seat back is rotated forward and folded on the seat cushion in a full-flat state via the hinge mechanism in such a manner that an angle between the passenger-support faces of the seat back and seat cushion is smaller than a specified narrow angle.

7. The seat for a vehicle of claim 1, wherein when the neck-support portion of the headrest in a rearmost stored position, a back face of the neck-support portion contacts an upper portion of the passenger-support face of the seat back.

8. The seat for a vehicle of claim 1, wherein the seat back is configured to have a standard position where a center line of the seat back is slightly inclined rearward relative to a vertical line by a specified angle, and the headrest pole member is configured to have an extension line thereof that is inclined relative to the center line of the seat back in the standard position toward the vertical line by a specified angle.

9. The seat for a vehicle of claim 1, wherein the top portion of the seat back is configured to allow a forward-rotation of the neck-support portion by the rotational support device.

10. The seat for a vehicle of claim 1, wherein the rotational support device further comprises a friction mechanism operative to provide a pressing force within a range of 30 to 150 N to suppress a rotation of the neck-support portion of the headrest and hold the neck-support portion with the pressing force.

11. The seat for a vehicle of claim 10, wherein the seat back is configured to be rotated forward via the hinge mechanism provided at a rear portion of the seat cushion with an operation from behind the seat, and a rear end portion of the headrest includes a portion that the passenger can hold from behind the seat when the headrest is in the lowest position.

12. The scat for a vehicle of claim 11, wherein the portion that the passenger can hold from behind the seat is provided behind the rotational axis around which the neck-support portion of the headrest is rotated.

13. The seat for a vehicle of claim 11, wherein the headrest is configured so as to be recognized from behind the seat that the lower end portion of the headrest is in a forward-rotated position when the headrest is in the lowest position.

14. The seat for a vehicle of claim 1, wherein the rotational support device further comprises a ratchet mechanism operative to allow only the forward-rotation of the neck-support portion of the headrest in a specified range, the neck-support portion that has been rotated forward beyond the specified range being allowed to be rotated rearward.

15. The seat for a vehicle of claim 1, wherein a frontal face of the main body of the headrest is substantially on the same plane with a frontal face of the neck-support portion of the headrest when the neck-support portion of the headrest is in a rearmost stored position.

16. A seat for a vehicle comprising:
a seat cushion having a passenger-support face
a seat back having a passenger-support face, the seat back being pivotally attached to the seat cushion via a hinge mechanism;
a headrest having a neck-support portion, the neck-support portion being provided to extend downward and operative to support a neck portion of a passenger:
a headrest pole member to support the headrest, the headrest pole member being provided at the seat back so as to move a position of the headrest between a lowest position and an upward-pulled position, wherein when the headrest is in the lowest position, a lower end portion of the neck-support portion of the headrest is located below a top portion of the seat back in an upright-use position; and
a rotational support device provided between the headrest and the headrest pole member, the rotational support device being operative to support the headrest in such a manner that at least the neck-support portion of the headrest is rotated around a rotational axis that extends in substantially a width direction of the seat back and held at a specified angle relative to the seat back, wherein when the headrest is the lowest position, at least the neck-support portion of the headrest is configured to be allowed to be rotated forward from a rearmost stored position thereof by the rotational support device, wherein the seat is configured such that the seat back can be rotated forward and folded on the seat cushion in such a manner that the passenger-support faces of the seat back and the seat cushion are substantially in parallel to each other, and the passenger-support face of the seat cushion is configured to have a recess, and at least part of the neck-support portion of the headrest that is in the lowest position is located in the recess of the passenger-support face of the seat cushion when the seat back is rotated forward and folded on the seat cushion.

* * * * *